United States Patent

Kosuda et al.

[11] Patent Number: 5,854,758
[45] Date of Patent: Dec. 29, 1998

[54] FAST FOURIER TRANSFORMATION COMPUTING UNIT AND A FAST FOURIER TRANSFORMATION COMPUTATION DEVICE

[75] Inventors: Tsukasa Kosuda; Motomu Hayakawa, both of Suwa; Naokatsu Nosaka, Chiba, all of Japan

[73] Assignees: Seiko Epson Corporation; Seiko Instruments, Inc., both of Tokyo, Japan

[21] Appl. No.: 692,991

[22] Filed: Aug. 6, 1996

[30] Foreign Application Priority Data

Aug. 28, 1995 [JP] Japan ................................. 7-219293
Jun. 14, 1996 [JP] Japan ................................. 8-154671

[51] Int. Cl.[6] .................................................. G06F 17/14
[52] U.S. Cl. .............................. 364/726.02; 364/726.01; 364/748.03; 702/77
[58] Field of Search .................... 364/726.01, 726.02, 364/726.03, 576, 748.01, 748.02, 748.03; 342/196; 600/454; 702/77

[56] References Cited

U.S. PATENT DOCUMENTS

| | | | |
|---|---|---|---|
| 3,778,606 | 12/1973 | Schmitt et al. | 364/726.01 |
| 3,927,312 | 12/1975 | Dickinson | 364/726.02 |
| 4,393,457 | 7/1983 | New | 364/726.02 |
| 4,612,626 | 9/1986 | Marchant | 364/726.02 |
| 4,751,929 | 6/1988 | Hayakawa et al. | 600/454 |
| 4,779,220 | 10/1988 | Nukiyama | 364/748.03 |
| 5,091,875 | 2/1992 | Wong et al. | 364/726.02 |
| 5,095,456 | 3/1992 | Yiwan et al. | |

FOREIGN PATENT DOCUMENTS 0 248 729 12/1987 European Pat. Off. .
WO 95/04963 2/1995 WIPO .

OTHER PUBLICATIONS

Electronic Design, Mar. 31, 1988, vol. 36, No. 8, 31 Mar. 1988, pp. 45–49, XP000104843, Bursky, D: "Tackle Real-–Time DSP Tasks With CMOS Chip Set".

IEE Proceedings G. Electronic Circuits & Systems, vol. 138, No. 6 Part G, 1 Dec. 1991, pp. 651–660, XP000274473, Arguello F. et al,: "Semisystolic Architecture For Fast Hartley Transform: Decimation In Frequency And Radix 2".

Primary Examiner—Ayaz R. Sheikh
Assistant Examiner—Douglas S. Lee
Attorney, Agent, or Firm—Eric B. Janofsky

[57] ABSTRACT

To provide FFT computing units, FFT computation devices, and pulse counters that can achieve computational precision using the smallest possible circuit size. FFT computing unit 602 comprises a data shift circuit for standardizing FFT computation target data to a specified bit width, adders/subtracters, multipliers, and data converters for standardizing the bit width to a certain bit width by truncating part of the output data of each computing unit, etc. FFT computation device comprises FFT computing unit 602, sensor 620, amplification circuit 621, gain control circuit 623, AD converter 622, first RAM 625 for sequentially storing the A/D conversion data, second RAM 626 for storing the FFT computation target data and the data being computed, coefficient ROM 101, and level determination circuit 624; and the level determination circuit determines the size of the data being transferred when the data is being transferred from RAM 1 to RAM 2, and the result is used for the data shift adjustment and gain control during FFT computation.

10 Claims, 17 Drawing Sheets

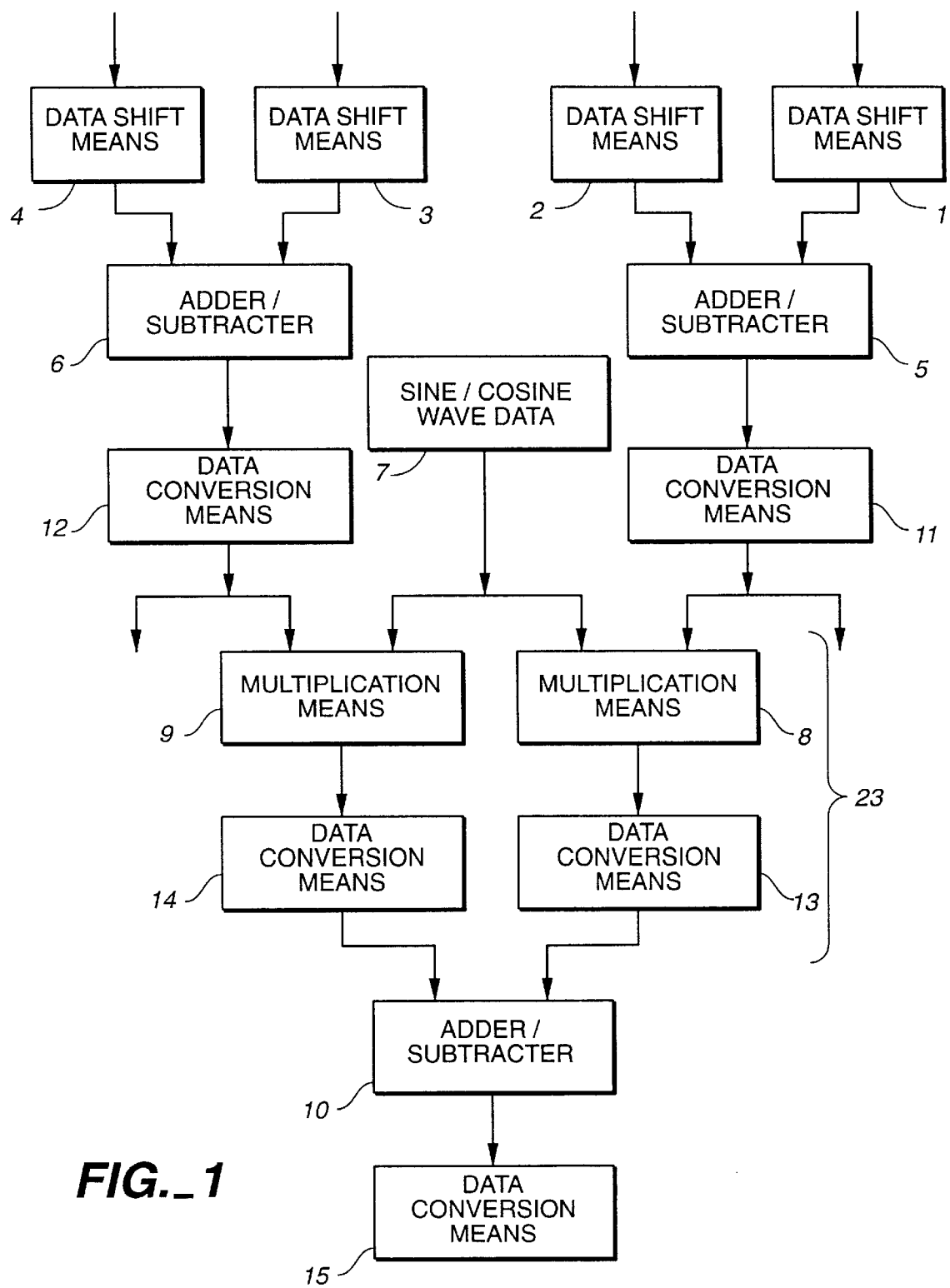
FIG._1

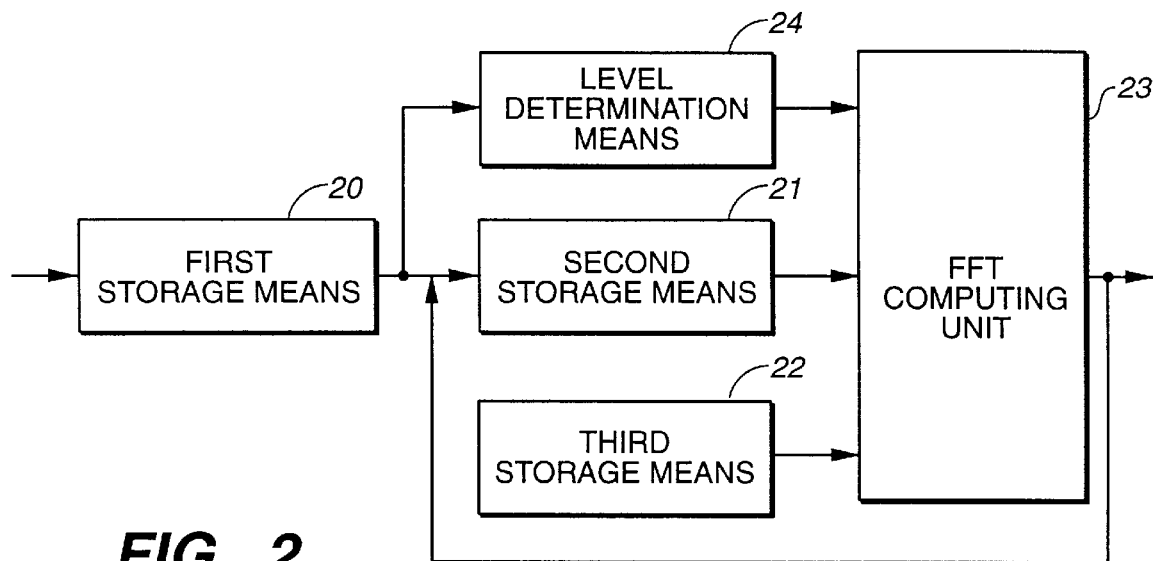
FIG._2
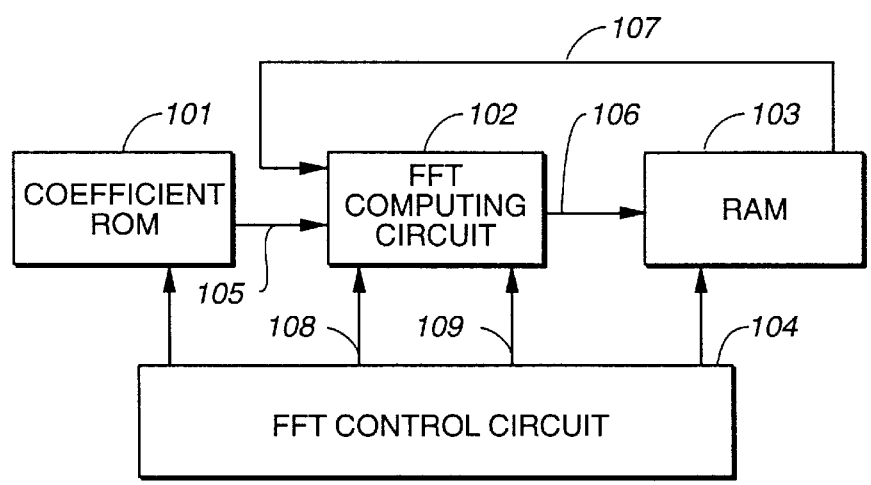
FIG._4

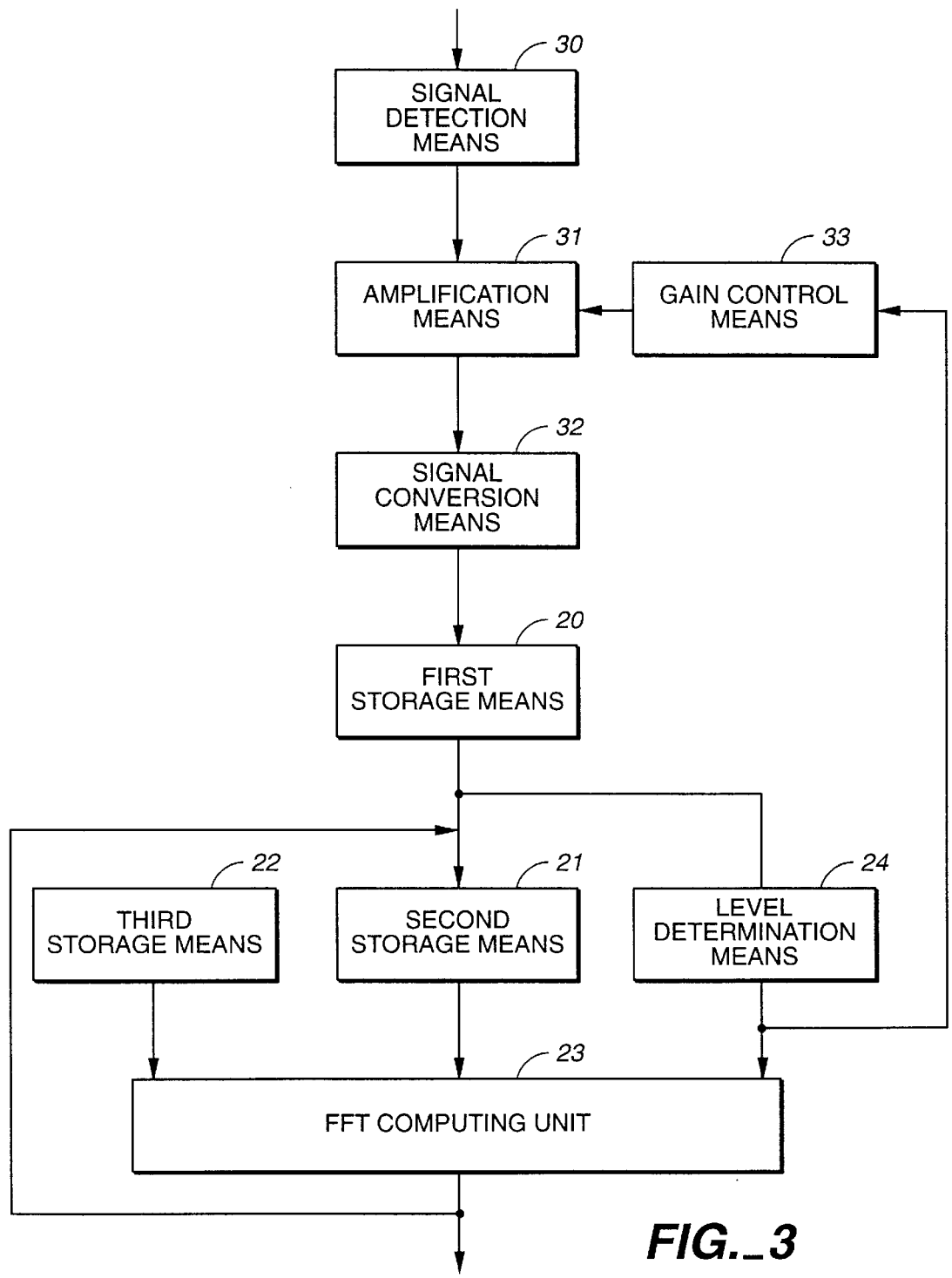
FIG._3

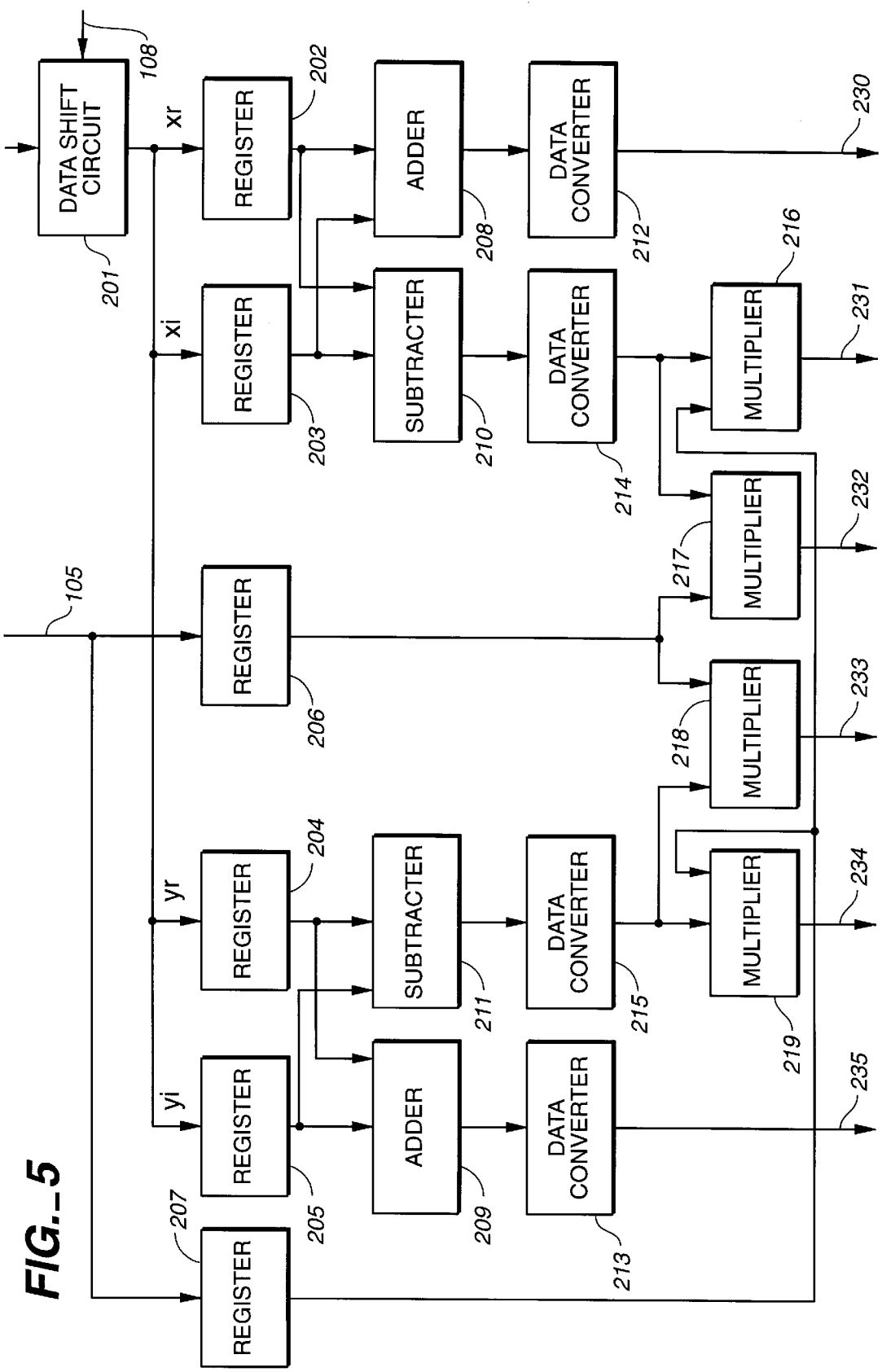
FIG._5

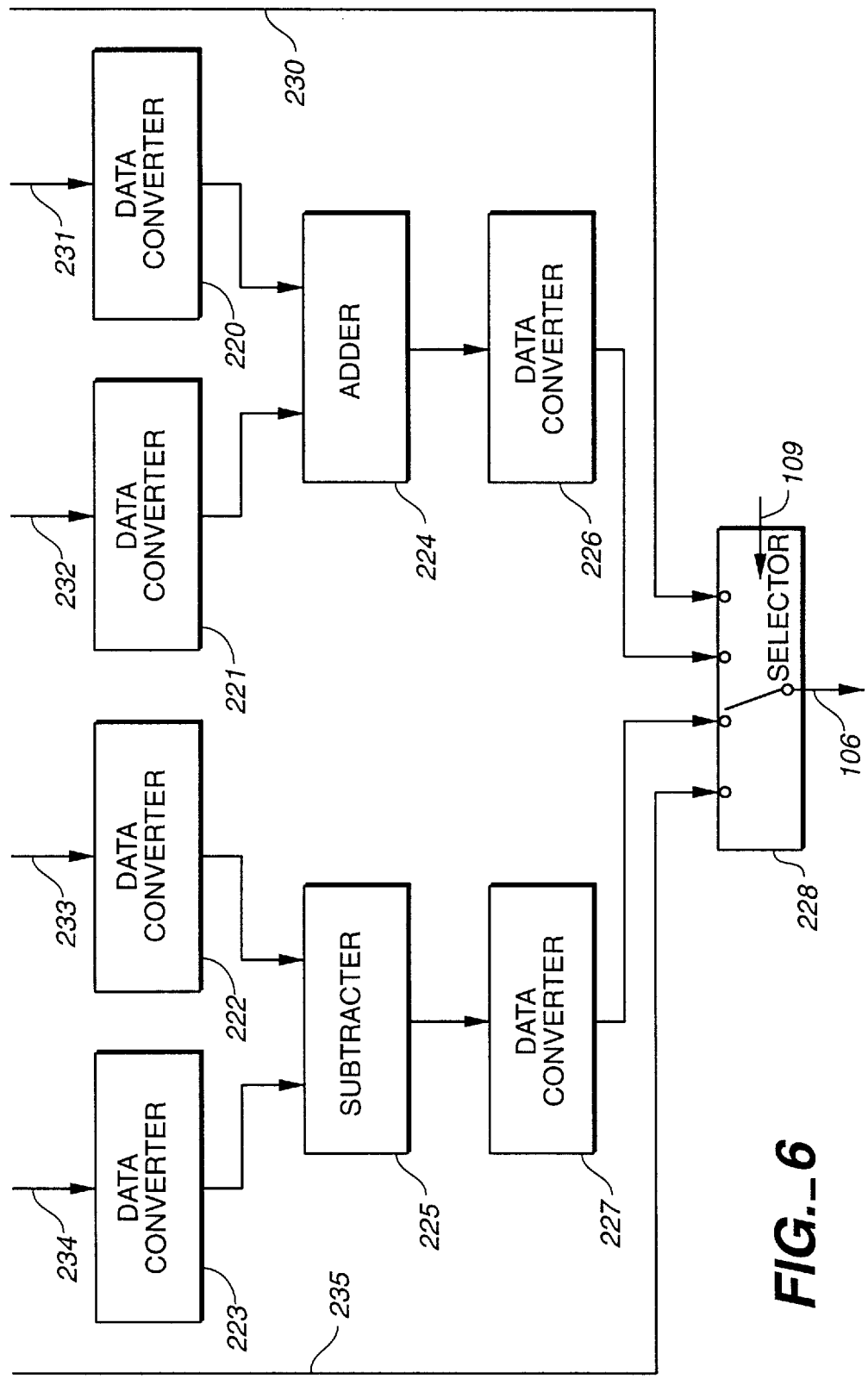
FIG._6

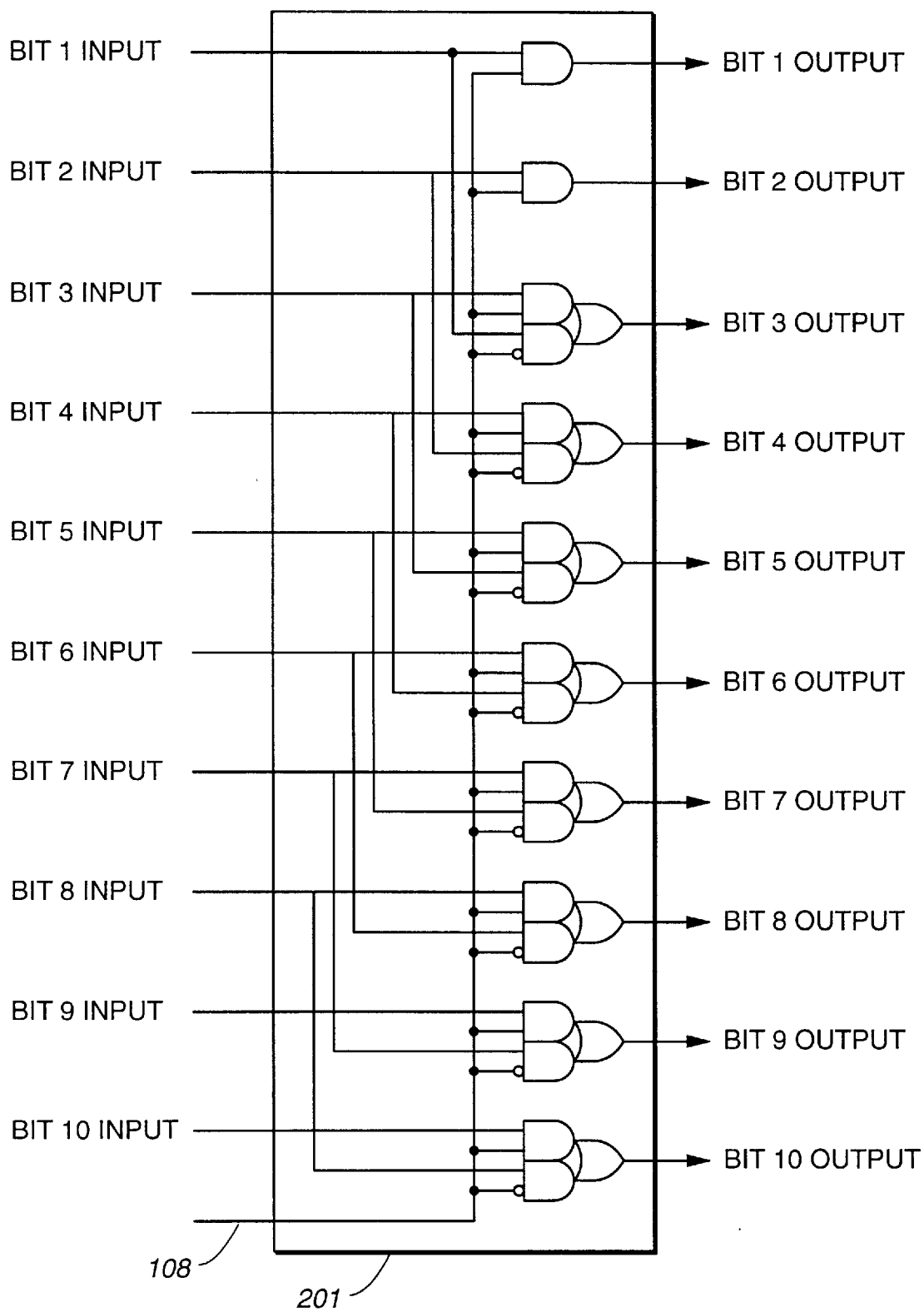
FIG._7

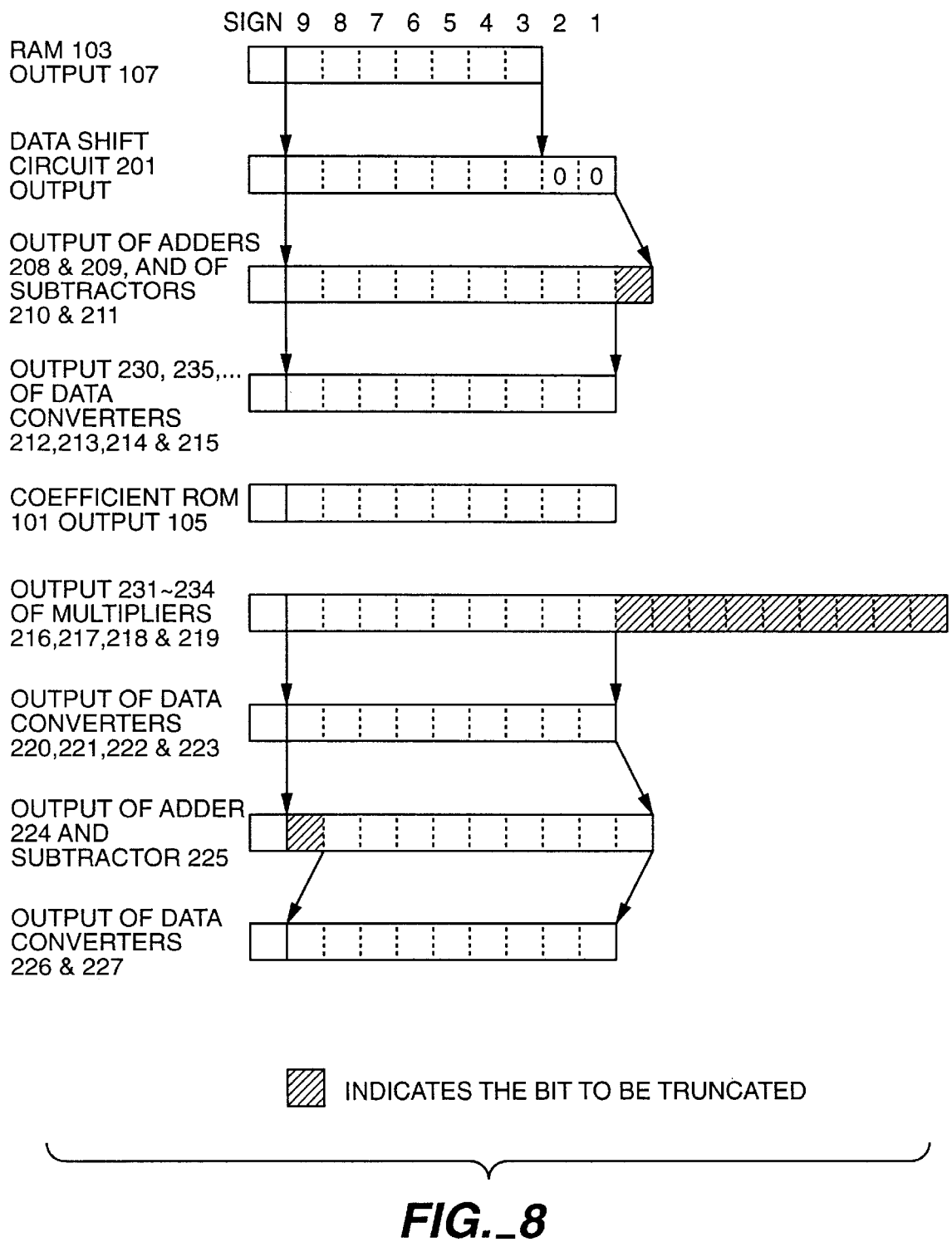
FIG._8

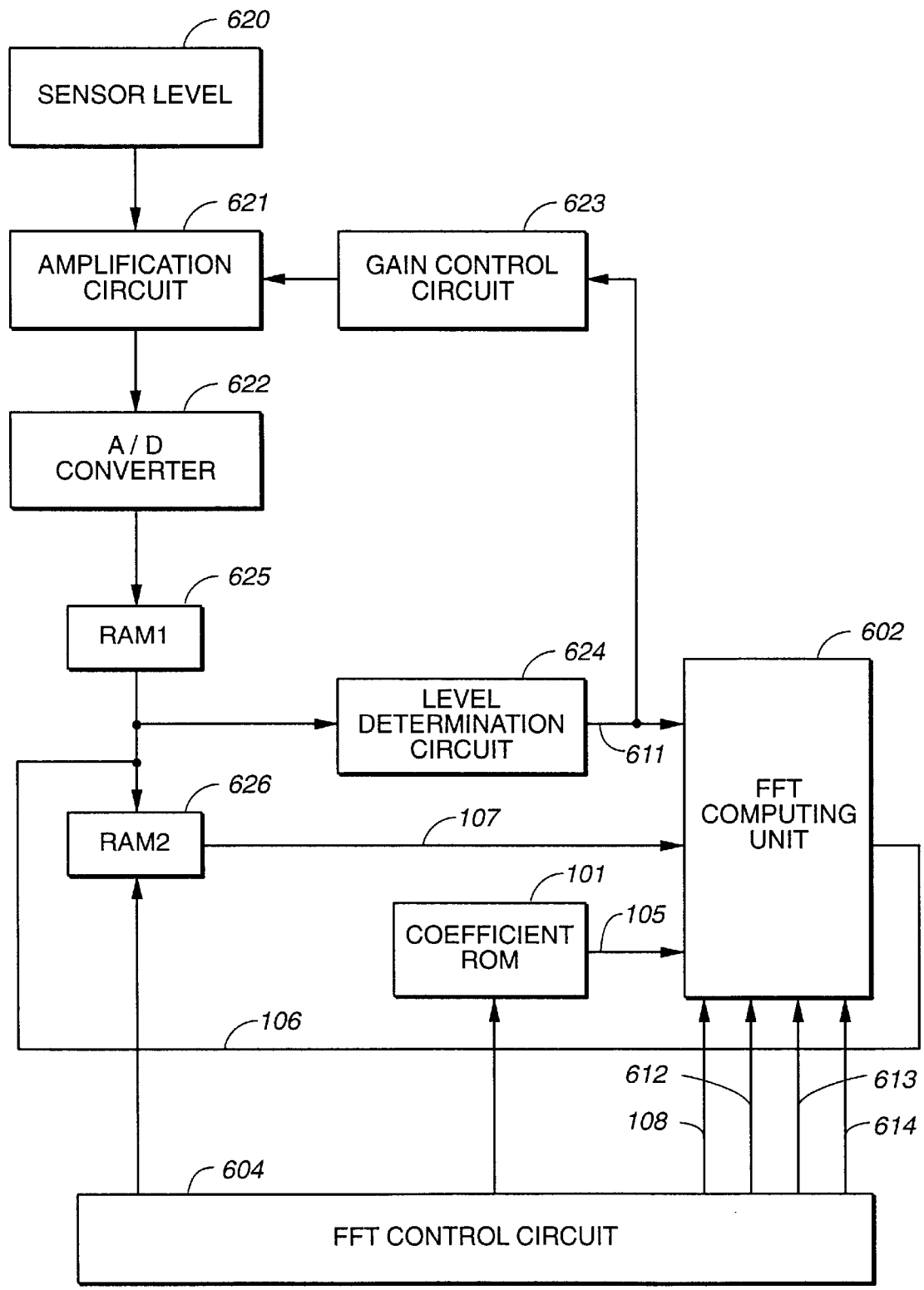
FIG._9

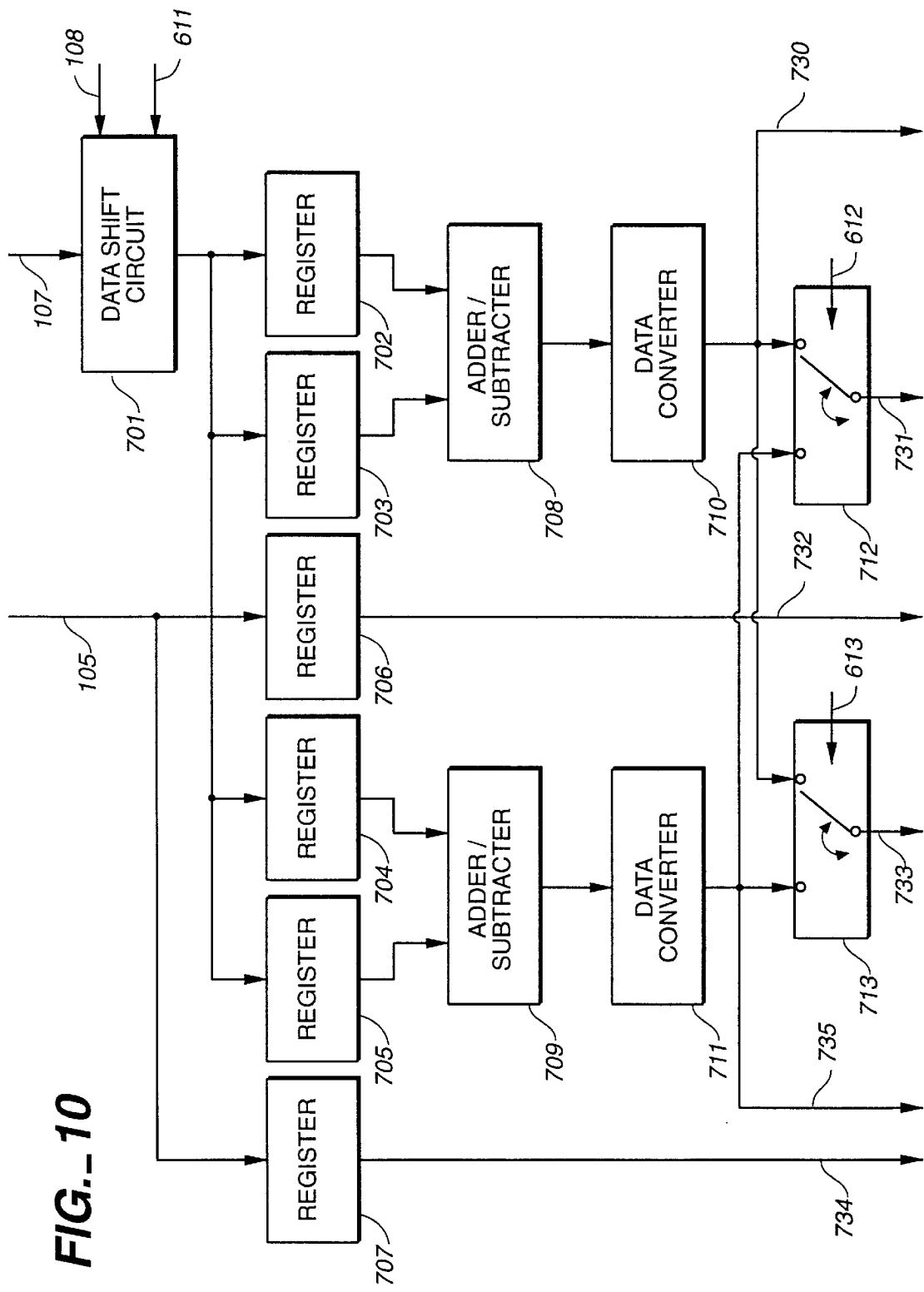
FIG._10

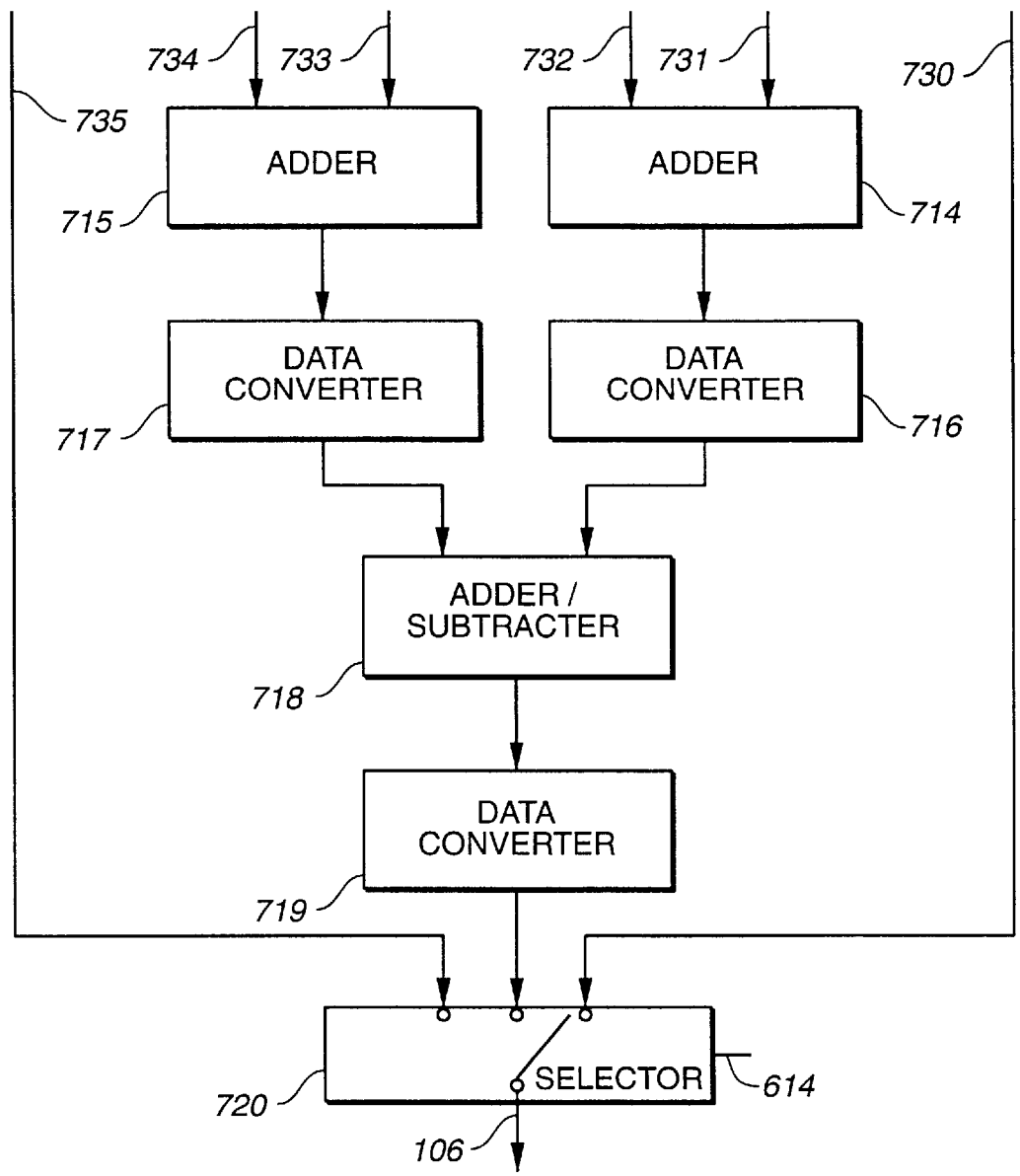
FIG._11

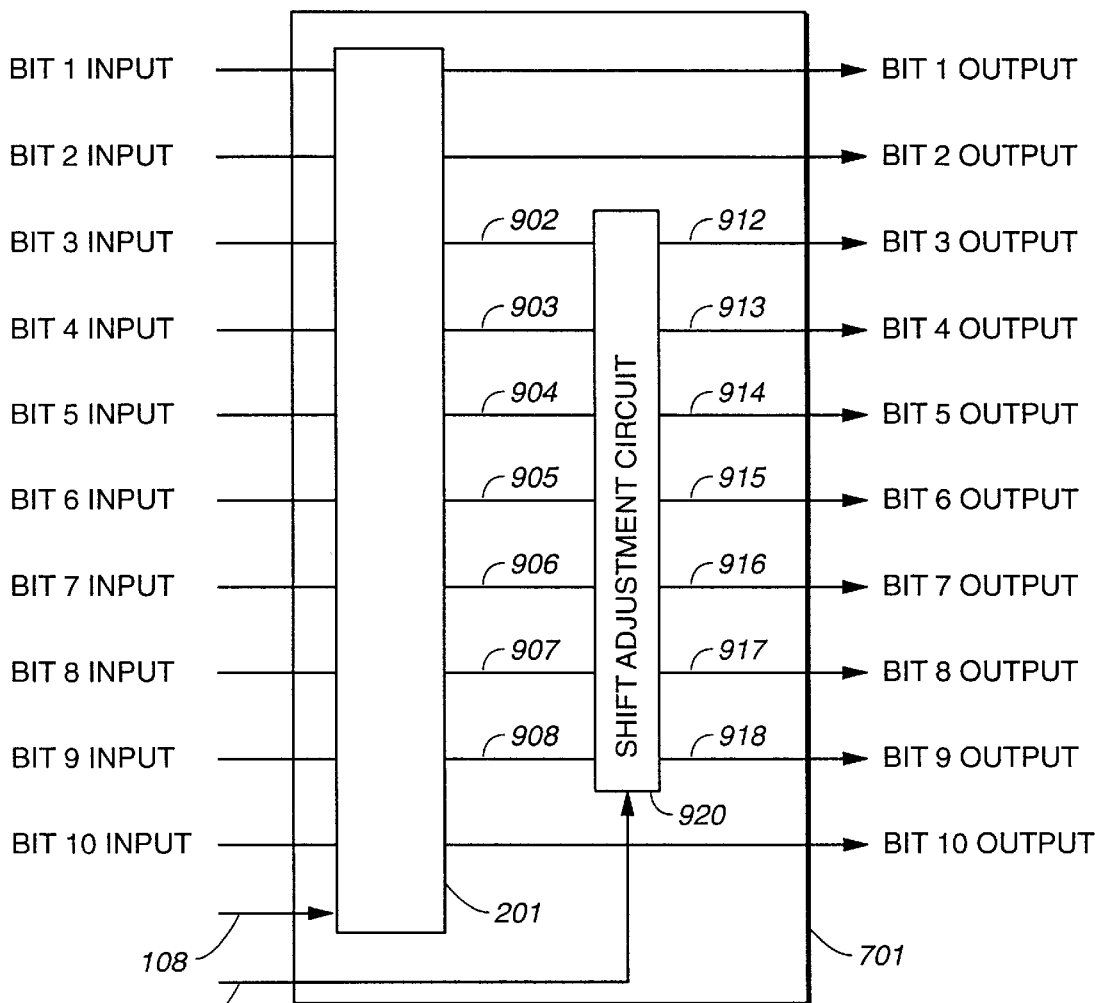
FIG._12A
OUTPUT 912 = INPUT 902 x 611a
OUTPUT 913 = INPUT 903 x 611a + INPUT 902 x 611b
OUTPUT 914 = INPUT 904 x 611a + INPUT 903 x 611b + INPUT 902 x 611c
OUTPUT 915 = INPUT 905 x 611a + INPUT 904 x 611b + INPUT 903 x 611c + 902 x 611d
OUTPUT 916 = INPUT 906 x 611a + INPUT 905 x 611b + INPUT 904 x 611c + 903 x 611d + 902 x 611e
OUTPUT 917 = INPUT 907 x 611a + INPUT 906 x 611b + INPUT 905 x 611c + 904 x 611d + 903 x 611e + 902 x 611f
OUTPUT 918 = INPUT 908 x 611a + INPUT 907 x 611b + INPUT 906 x 611c + 905 x 611d + 904 x 611e + 903 x 611f + 902 x 611g
FIG._12B

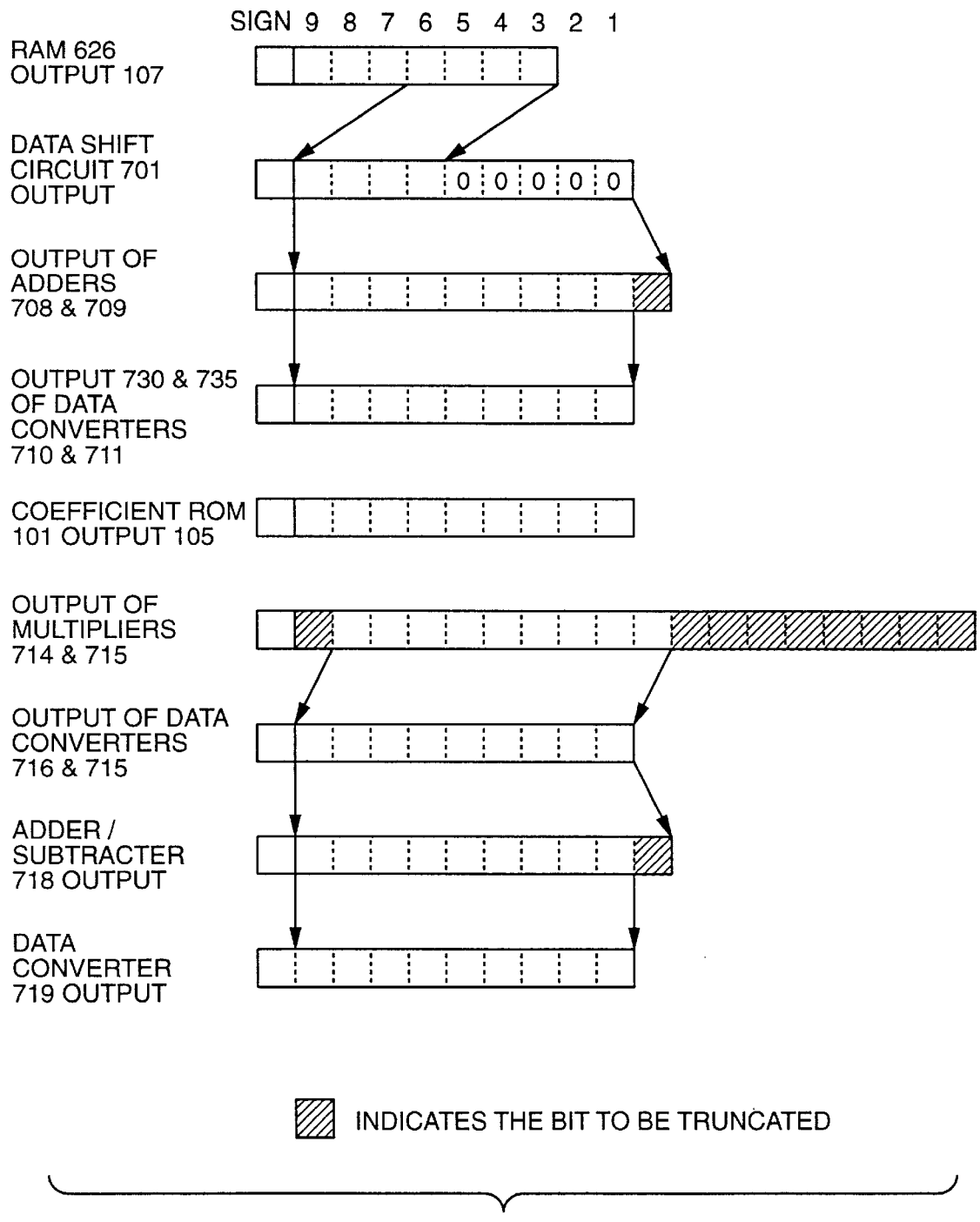
FIG._13

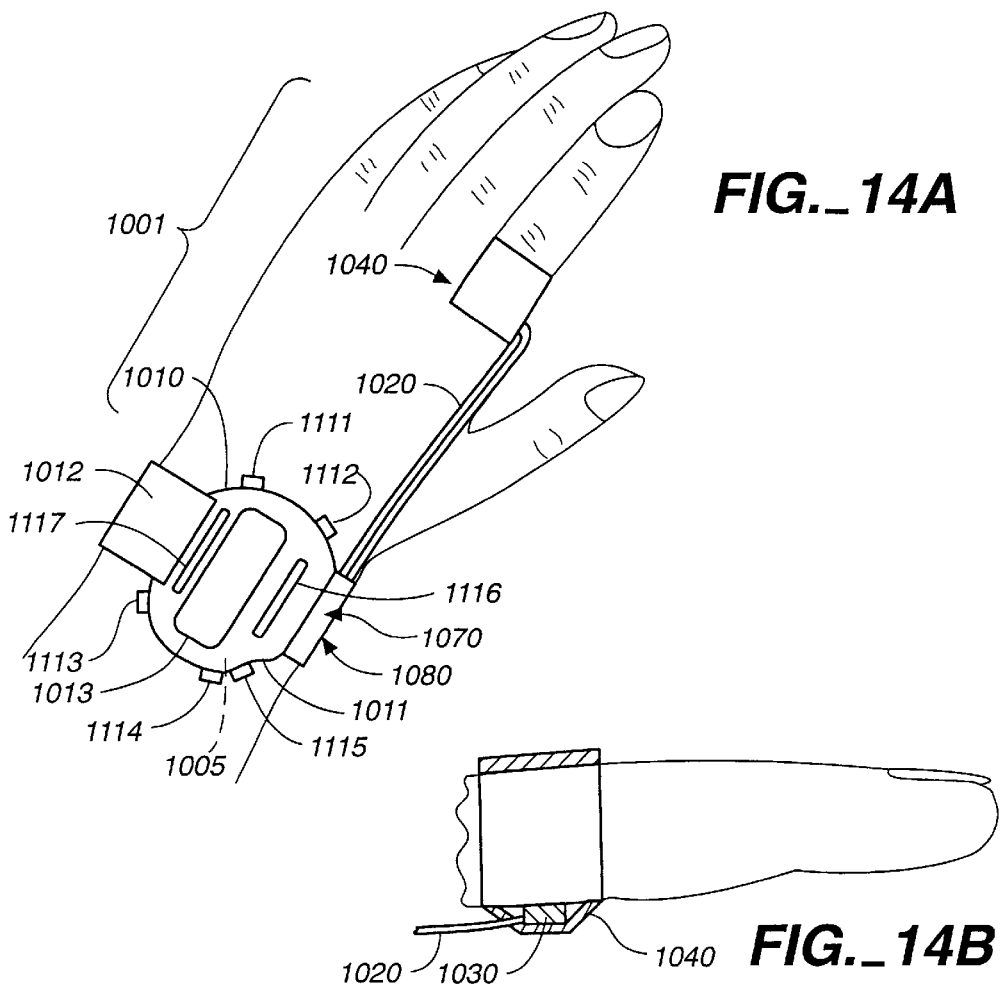
FIG._14A
FIG._14B
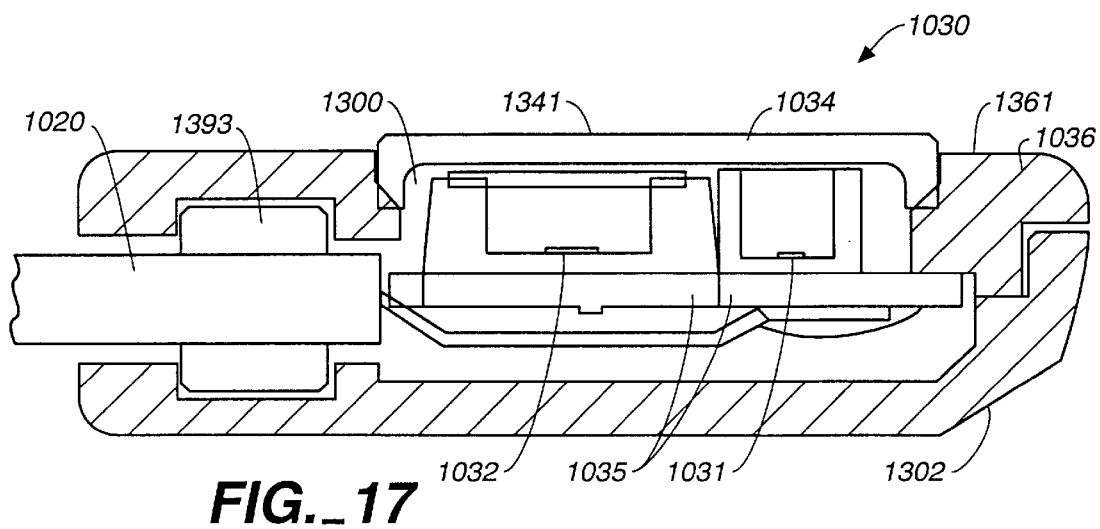
FIG._17

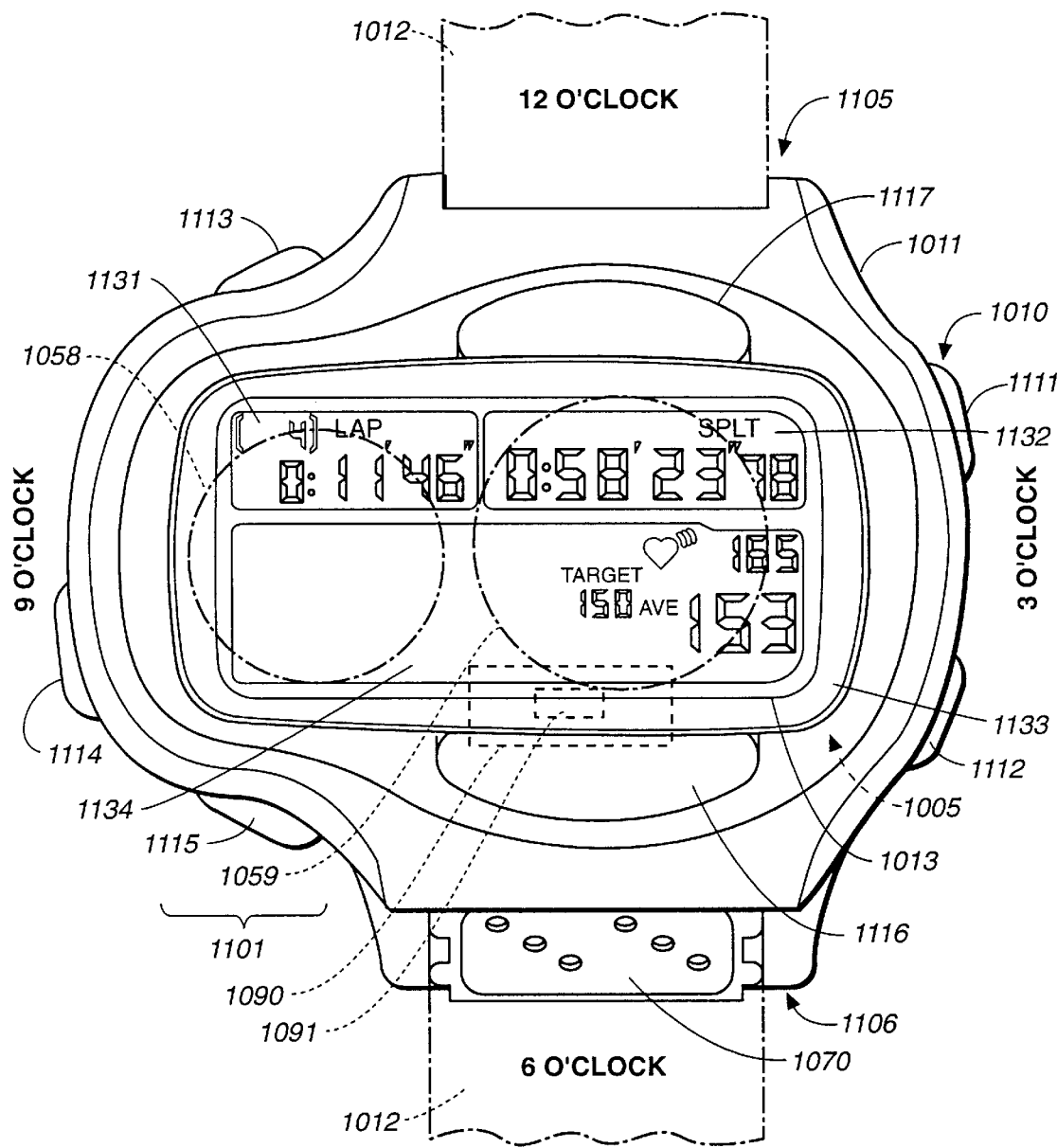
FIG._15

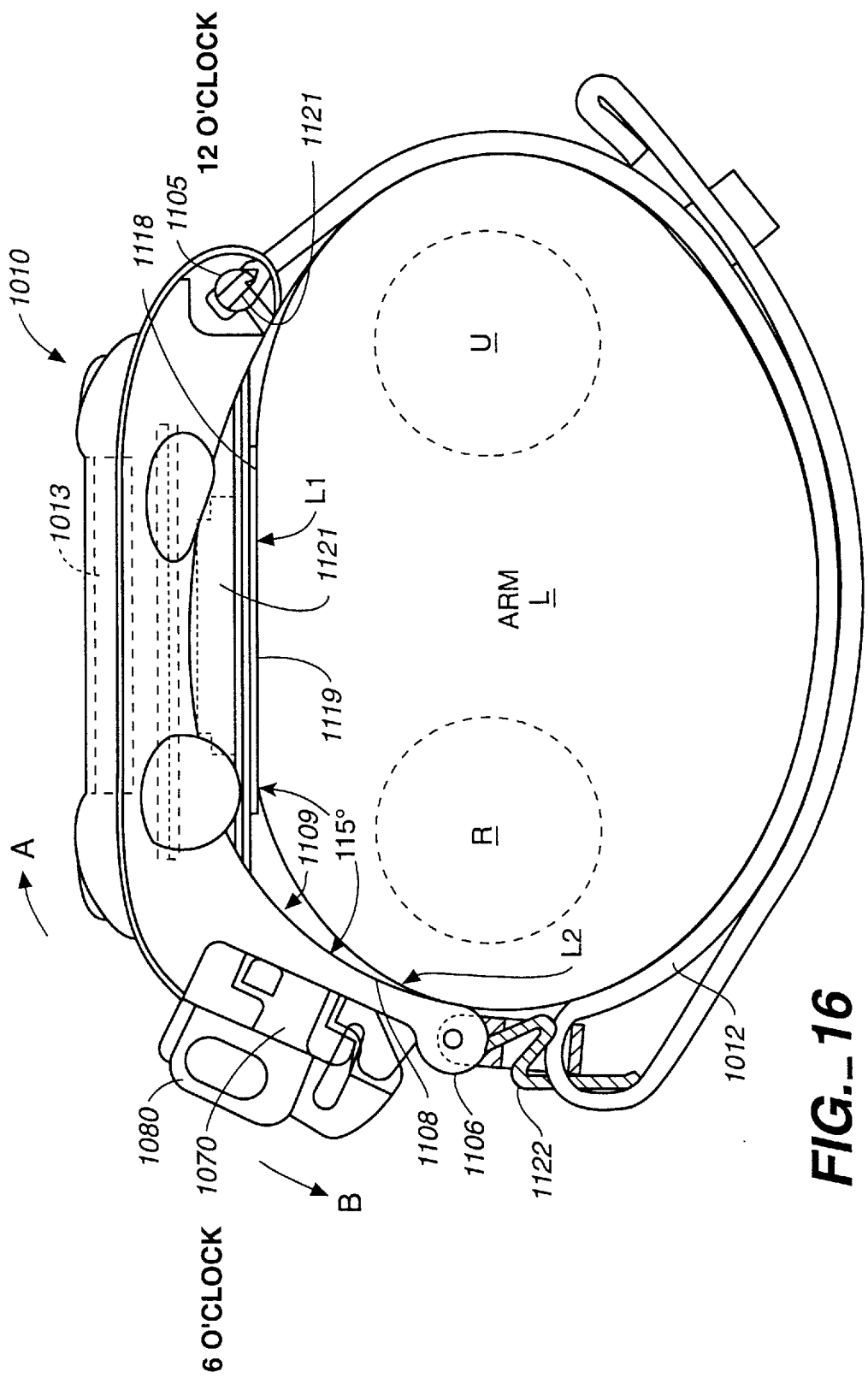
FIG._16

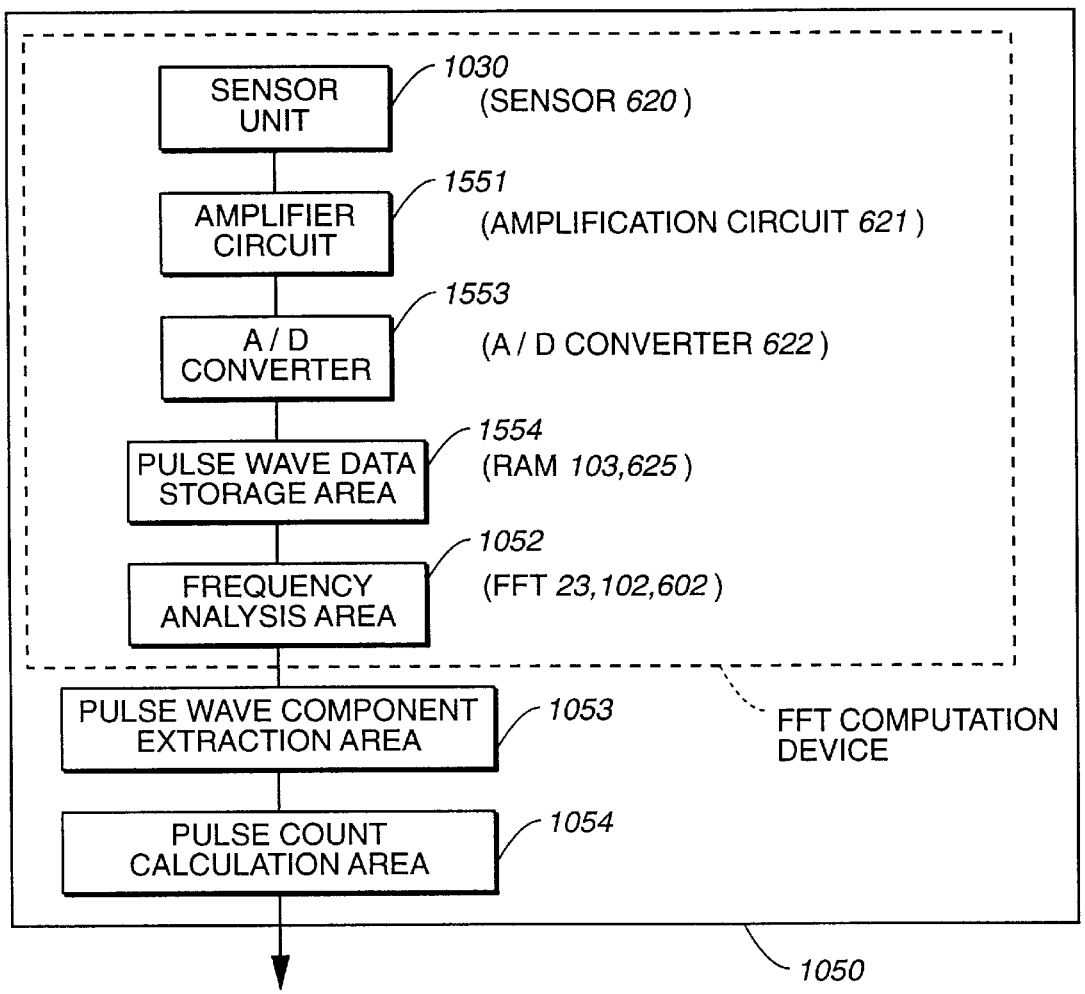
FIG._18
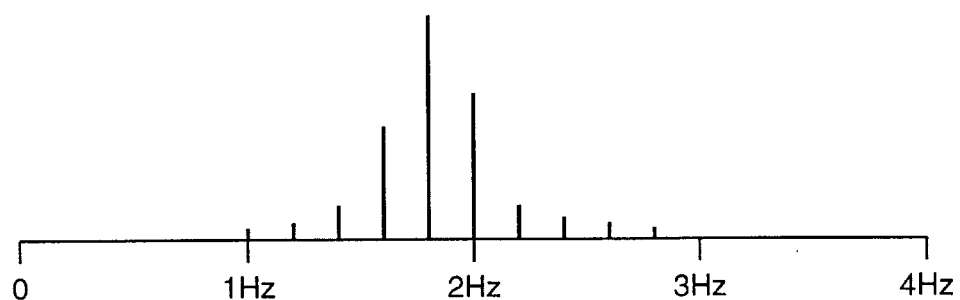
FIG._19

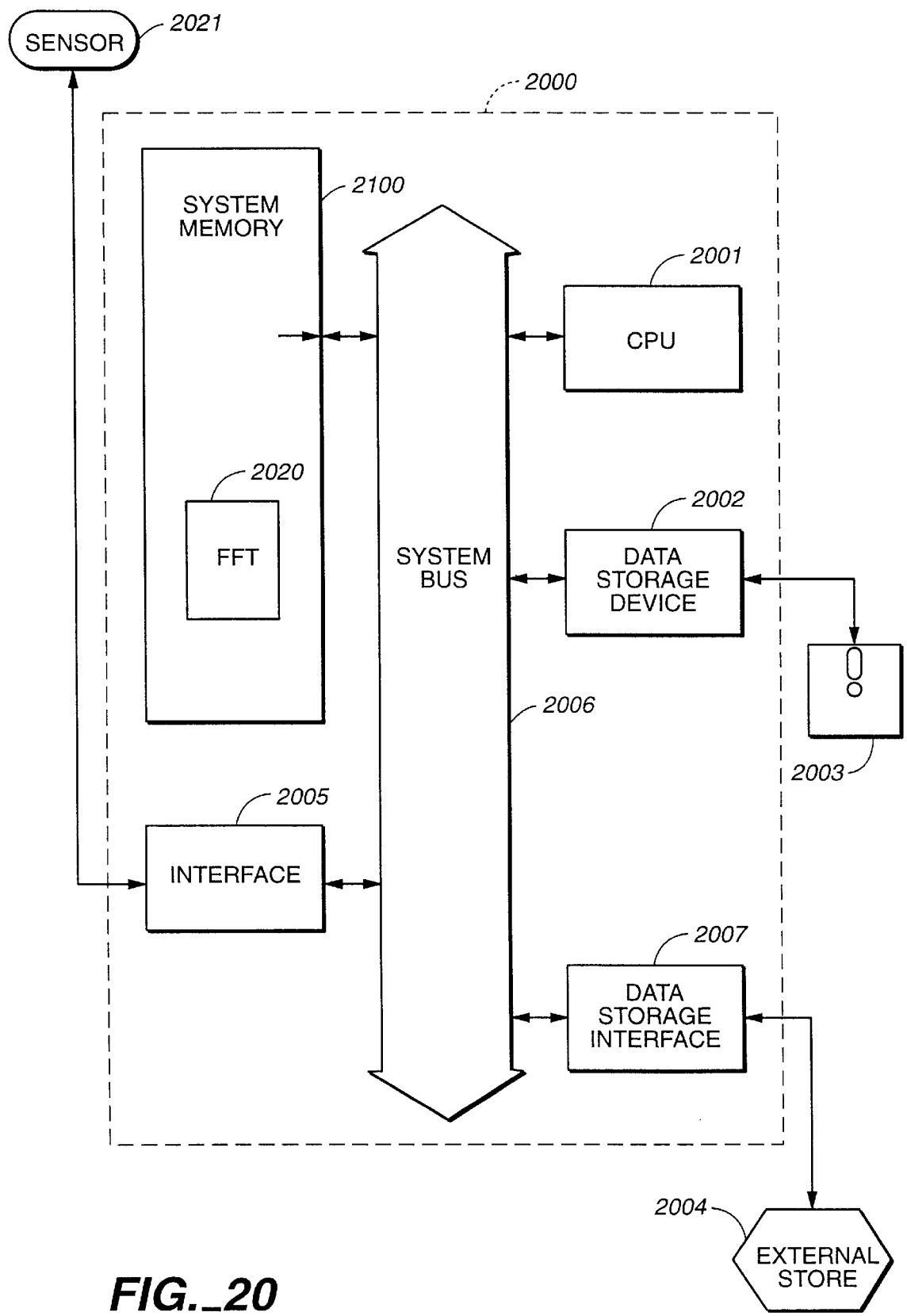
FIG._20

FAST FOURIER TRANSFORMATION COMPUTING UNIT AND A FAST FOURIER TRANSFORMATION COMPUTATION DEVICE

BACKGROUND OF THE INVENTION

1. Field of the Invention

The present invention relates to a computing unit using fast Fourier transformation (FFT) for analyzing signals obtained over time. The present invention particularly relates to a fast Fourier transformation computation device (FFT computation device) using this FFT computing unit, and to a pulse counter using said FFT computing unit.

2. Description of the Related Art

When the target data N of FFT computation can be expressed as $2^s$ the FFT result can be obtained by repeating base 2 butterfly computations S times. The frequency-sampling butterfly computation when the data count is N and the base is 2 can be expressed in the equation below.

$$X=x+y, \quad Y=(x-y)W^K$$

where $$W^K = \exp(-2\pi j/N)$$

If the above equation is separated into real and imaginary parts without using complex number operations, the following four equations result.

$$XR = xy + yi$$

$$A \cdot \cos(2\pi K/N) + B \cdot \sin(2\pi K/N)$$

$$XR = yr + yi$$

$$YI = B \cdot \cos(2\pi K/N) - A \cdot \sin(2\pi K/N)$$

where $$A = xr - xi \text{ and } B = yr - yi$$

An FFT result can be obtained by implementing the above four equations using a butterfly computing unit comprising an adder, a subtracter, and a multiplier, and repeatedly using it. Note however that the sine wave and cosine wave data are real numbers between −1 and 1. The precision of the FFT operation is determined by the bit length and data format of each of the above computing units. In a conventional approach, floating-point arithmetic is sometimes used to maintain computational precision, as disclosed in examined Japanese patent publication No. S60-41391 and unexamined Japanese patent application H5-174046. In the case of fixed-point arithmetic, computational precision is maintained using a method such as that checks overflow and shifts bits of the computational result, as disclosed in unexamined Japanese patent application No. S60-7575.

However, when floating-point or fixed-point arithmetic is used for obtaining a high level of computational precision as in conventional methods, a computing unit that can process data of at least 16-bit length is required, and thus it is difficult to implement FFT operation using a small circuit.

Furthermore, the method that checks overflow during the computation process and performs bit shift on the computation result to obtain a high level of computational precision using short data length, requires a function for checking the computation result in each computation process, resulting in a larger circuit size.

OBJECTS OF THE INVENTION

Therefore, it is an object of the present invention to overcome the aforementioned problems.

It is another object of the present invention to implement an FFT computing unit and an FFT computation device that can achieve computational precision using the smallest possible circuit size, by achieving computational precision using data expression of around 10-bit length without a special function for checking the computation result in the computation process.

It is a further object of the present invention to provide a pulse counter that uses such an FFT computing unit for analyzing frequency and that determines the pulse count based on the frequency analysis result.

SUMMARY OF THE INVENTION

According to an aspect of the present invention, a fast Fourier transformation computing unit comprises addition/subtraction means for computing and outputting the sum of or the difference between two pieces of integer data, multiplication means for multiplying the output by sine and cosine wave data, and adder/subtracter for computing the sum of or the difference between the outputs from both multiplication means.

The computing unit comprises data shift means for standardizing data to a certain bit width before the addition/subtraction means computes the sum of or the difference between two pieces of integer data. Data conversion means is further provided for standardizing bit width to the certain bit width by truncating part of output data for each output of computation means.

In accordance with the present invention, bit standardization to a certain bit width by data shift means and data conversion means eliminates the need for overflow monitoring. Therefore, FFT computation can be performed at high precision even when complicated control means are eliminated, allowing the size of FFT computing unit to be smaller than conventionally possible.

In accordance with a second aspect of the present invention, when the bit width of the input into the computation means inside FFT computing unit is n bits, truncation errors during the FFT computation process can be made smaller if sine and cosine wave data is stored as an integer after multiplying the sine and cosine wave data of a real number by $2^{n-1}$, truncating positive numbers, and rounding up negative numbers, than if such data were stored in another format. Furthermore, by using data that has been converted into a number such that its bits excluding the sign can be expressed within n−1 bits, the truncation caused by rounding-up during FFT computation can be prevented.

The data conversion means preferably truncate the highest bit of the output data, excluding the sign bit, when converting either the output data of said multiplication means or the output data of said addition/subtraction means. With such a configuration, truncation/rounding-up is performed and the data shift is adjusted during the computation process that is least likely to produce degradation in computational precision, among the computation processes of the imaginary part in which more computations take place than in the real part. Therefore, a high level of computational precision can be achieved by making the shift the same as that used when obtaining the computation result for the real part.

Moreover, data shift means are preferably provided with shift adjustment means for adjusting the data shift in accordance with the size of the FFT computation target data. With such a configuration, a shift that better matches the FFT computation target. data is set, resulting in a larger number of effective digits during computation. Therefore, the computational precision can be improved.

In accordance with a third aspect of the present invention, the FFT computation device comprises first storage means for sequentially storing the data that is input in a time series, second storage means for storing both the FFT computation target data and the data being computed, level determination means for determining the size of the data stored in second storage means, and third storage means for storing the sine wave and cosine wave data for computation.

The FFT computation is performed by FFT computing unit using the data from both second storage means and third storage means. After the specified number of pieces of data is stored in first storage means, simultaneously with sending of the FFT computation target data to second storage means, the size of the transferred data is determined by level determination means, and based on the determined level, shift adjustment means adjusts the data shift.

With such a configuration, after the specified number of pieces of data is stored in first storage means, simultaneously with sending of the FFT computation target data to second storage means, the size of the transferred data is determined by level determination means, and thus it is not necessary to separately allocate time for the level determination to be performed for adjusting the shift.

In accordance with a fourth aspect of the present invention, FFT computation device comprises amplification means for amplifying the signal detected by signal detection means, gain control means for changing the amplification rate of this amplification means, first storage means for sequentially storing the output signals of the amplification means that have been converted to digital signals by signal conversion means, second storage means for storing both the fast Fourier transformation computation target data and the data being computed, level determination means for determining the size of the data stored in this second storage means, and third storage means that stores the sine wave and cosine wave data for computation.

The fast Fourier transformation computation is performed by fast Fourier transformation computing unit using the data from both second storage means and third storage means. After the specified number of pieces of data is stored in the first storage means, simultaneously with sending of the fast Fourier transformation computation target data to the second storage means, the size of the transferred data is determined by said level determination means, and based on the determination result, the gain control means changes the amplification rate of said amplification means.

With such a configuration, gain control means can change the amplification rate of the amplification means to an appropriate value based on the level determined by level determination means. Therefore, since the detected signal itself before digital conversion can be controlled to a size suitable to FFT computation in an analog format, computational precision in subsequent FFT computation results can be improved when FFT computations are continuously made.

An FFT computing unit and an FFT computation device thus configured can be used to configure a pulse counter that analyzes the frequency of a pulse wave signal and determines the pulse count based on the frequency analysis result.

As explained above, the present invention is provided with data shift means that standardize data to a certain bit width before the sum or difference of two pieces of integer data is computed and with data conversion means that standardize bit width to a certain bit width by truncating part of output data for each output of computation means, and thus eliminates the need for overflow monitoring. Therefore, FFT computation can be carried out at a high level of computational precision without any complicated control means, making it possible to implement a small FFT computing unit.

When the bit width of the input into the computation means inside the FFT computing unit is n bits, the present invention uses sine and cosine wave data that has been turned into an integer by multiplying the sine and cosine wave data of a real number by $2^{n-1}$, truncating positive numbers, and rounding up negative numbers; and that has been converted into a number such that its bits excluding the sign can be expressed within n-1 bits, and thus truncation errors during the FFT computation process can be made smaller than when sine and cosine wave data expressed in another format is used. Therefore, a high level of computational precision can be achieved since the truncation caused by rounding-up during FFT computation can be prevented.

Moreover, the highest bit of the output data, excluding the sign bit, is truncated when converting either the output of the multiplication means or the output of the addition/subtraction means that computes the sum or difference of the multiplication means, and thus the data shift is adjusted by performing truncation/rounding-up during the computation process that is least likely to produce degradation in computational precision, among the computation processes of the imaginary part in which more computations take place than in the real part. Therefore, a high level of computational precision can be achieved by making the shift the same as that used when obtaining the computation result for the real part.

Further, a shift adjustment means is provided for adjusting the data shift in accordance with the size of the FFT computation target data, and thus a larger number of effective digits can be obtained during computation, producing a high level of computational precision.

After the specified number of pieces of data is stored in the first storage means which sequentially stores the data that is input in a time series, simultaneously with sending of the FFT computation target data to the second storage means which stores both the FFT computation target data and the data being computed, the size of the transferred data is determined by the level determination means, and the shift is adjusted based on the determined level, and thus it is not necessary to separately allocate time for the level determination to be performed for adjusting the shift.

Finally, the gain control means which, after the specified number of pieces of data is stored in the first storage means which sequentially stores the digitally converted output signal from the amplification means, and simultaneously with sending of the FFT target data to the second storage means, determines the size of the transferred data, and which, based on the determined level, changes the amplification rate of the amplification means for amplifying the signal detected by the signal detection means to an appropriate value, and thus the detected signal itself before digital conversion can be controlled to a size suitable to FFT computation in an analog format. Therefore, computational precision in subsequent FFT computation results can be improved when FFT computations are continuously made.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts

FIG. 1 is a functional block diagram of an FFT computing unit in accordance with the present invention;

FIG. 2 is a functional block diagram of a level determination means in accordance with the FFT computing unit of FIG. 1;

FIG. 3 is a functional block diagram of a level determination means and a gain control means in accordance with the FFT computing unit of FIG. 1;

FIG. 4 is a functional block diagram of a FFT computation device in accordance with the first embodiment of the present invention;

FIG. 5 is a functional block diagram of a front part of the FFT computation unit of FIG. 4;

FIG. 6 is a functional block diagram of a back part of the FFT computation unit of FIG. 4;

FIG. 7 is a logic diagram of a data shift circuit provided in the FFT computation device of FIG. 4;

FIG. 8 is a diagram illustrating data bit length changes during the computation process in the FFT computation device of FIG. 4;

FIG. 9 is a functional block diagram of a FFT computation device in accordance with a second embodiment of the present invention;

FIG. 10 is a functional block diagram showing the front part of the FFT computation unit of FIG. 9;

FIG. 11 is a functional block diagram of the back part of the FFT computation unit of FIG. 9;

FIG. 12A is a schematic diagram showing the data shift circuit provided in the FFT computation device of FIG. 9, FIG. 12B depicts the function of the shift adjustment circuit inside the data shift circuit thereof;

FIG. 13 is a diagram illustrating data bit length changes during the computation process in the FFT computation device of FIG. 9;

FIGS. 14A and B are diagrams showing the overall configuration of a portable pulse counter that utilizes the FFT computing unit in accordance with the present invention;

FIG. 15 is a top view of the device main body of the portable pulse counter of FIGS. 14A and B;

FIG. 16 is a diagram of the device main body of the portable pulse counter shown in FIGS. 14A and B, as viewed from the 3 o'clock direction of the wrist watch;

FIG. 17 is a cross-sectional view of the sensor unit of the portable pulse counter of FIGS. 14A and B;

FIG. 18 is a functional block diagram of the data processing circuit provided in the control area of the portable pulse counter of FIGS. 14A and B;

FIG. 19 is a spectral diagram of the frequency of pulse wave signals as analyzed by the pulse wave data processing circuit of the portable pulse counter of FIGS. 14A and B and FIG. 20 is a block diagram of a representative processing system capable of implementing the presently preferred embodiments.

DESCRIPTION OF THE PREFERRED EMBODIMENTS

The embodiments of the present invention will be explained with references to accompanying drawings.

Embodiment 1

FIG. 4 shows a functional block diagram of the FFT computation device in accordance with the first embodiment of the present invention. This FFT computation device uses FFT computing unit 23 shown in FIG. 1 as a representative example of the invention. This FFT computing unit is described as FFT computing unit 102 in FIG. 4, and its detailed configuration is divided and described in FIGS. 5 and 6.

The individual configuration elements shown in FIGS. 4, 5, and 6 correspond to the individual configuration elements shown in FIG. 1 as follows. First, the content of coefficient ROM 101 shown in FIG. 4 corresponds to sine/cosine wave data 7 shown in FIG. 1. Data shift circuit 201 shown in FIG. 5 corresponds to data shift means 1 through 4 shown in FIG. 1; adders 208 and 209 and subtracters 210 and 211 shown in FIG. 5 correspond to addition/subtraction means 5 and 6 shown in FIG. 1; data converters 212 through 215 shown in FIG. 5 correspond to data conversion means 11 and 12 shown in FIG. 1; and multipliers 216 through 219 shown in FIG. 5 correspond to multipliers 8 and 9 shown in FIG. 1. Furthermore, data converters 220 through 223 shown in FIG. 6 correspond to data conversion means 13 and 14 shown in FIG. 1; adder 224 and subtracter 225 shown in FIG. 6 correspond to addition/subtraction means 10 shown in FIG. 1; and data converters 226 and 227 shown in FIG. 6 correspond to data conversion means 15 shown in FIG. 1.

The FFT computation device of this embodiment will be explained using as an example a case in which the bit length of the input into each FFT computing unit 102 is 10 bits (one sign bit and nine absolute value data bits), by referring to FIGS. 4 through 6. Here, the FFT computation target data consists of 128 pieces of data in the 8-bit signed absolute value format (one sign bit and seven absolute value data bits) which are stored in RAM according to a time-series order. When the FFT computation target data count is 128, an FFT result is obtained by repeating butterfly computation seven times.

Since the bit length of the input into each FFT computing unit is 10 bits (one sign bit and nine absolute value data), the trigonometric function table which is a set of sine/cosine wave data will contain $C \cdot \sin(2\pi K/128)$ (where $C = \pm 2^9$ and $K = 0-127$) as a 10 bit value (one sign bit and nine absolute value data bits). However, since the absolute data value bit will be bit 10 if $C \cdot \sin(2\pi K/128)$ is $+2^9$ or $-2^9$, the trigonometric table data in coefficient ROM stores $2^9 - 1$ when the value is $+2^9$ and $-(2^9 - 1)$ when the value is $-2^9$, in this embodiment.

In FIGS. 4 through 6, FFT computation target data is stored in RAM 103, and this data stored in RAM 103 goes through data shift circuit 201 inside FFT computing unit 102 and is set in registers 202 through 205 as xr, xi, yr and yi data. Data shift circuit 201 shifts the FFT computation target data stored in RAM 103 to match the bit length of the input into the computing unit. In this embodiment, data shift circuit 201 outputs data that has been standardized to the 10 bits of the computing unit input bit length by shifting bit 8 of the FFT computation target data by 2 bits to the left and entering 0's in the lower 2 bits that no longer contain data. However, data shift circuit 201 is activated only during the first of the seven repeated butterfly computations, and the data shift function is not activated during the remaining six rounds and the input data is output as is. This kind of control is performed based on control signal 108 from FFT control circuit 104. Note that data shift circuit 201 is configured using logic circuits as shown in FIG. 7.

Again in FIGS. 4 through 6, the data that is latched to registers 202 through 205 is input into adders 208 and 209 and subtracters 210 and 211. Adders 208 and 209 and subtracters 210 and 211 are 10-bit input, 11-bit output computing units (with the highest bit used as the sign bit), and the 11-bit output data is input into data converters 212 through 215.

In data converters 212 through 215, the lowest bit is truncated, and the upper 10-bit data is sent to the next step. The output of data converter 212 is XR(Xr=xr+xi), and the output of data converter 213 is YR(YR=yr+yi), both of which are sent to selector 228. The output of data converter 214 is A (A=xr−xi), and the output of data converter 215 is (B=yr−yi), which are input into one side of multipliers 216 through 219.

Next, the values of C·sin(2πK/128) and C·cos(2πK/128) from coefficient ROM 101 are set in registers 206 and 207, respectively, and these values are input into the other side of multipliers 216 through 219. Multipliers 216 through 219 are 10-bit input (with the highest bit used as the sign bit), 19-bit output computing units (with the highest bit used as the sign bit), and the upper 10-bit data is decoded by data converters 220 through 223 and sent to the next step.

The outputs of data converters 220 through 223 are expressed as follows.

Output of data converter 220=A·cos(2πK/(128)

Output of data converter 221=A·sin(2πK/128)

Output of data converter 222=B·sin(2πK/128)

Output of data converter 223=B·cos(2πK/128)

The 10-bit output data of data converters 220 through 223 is input into 10-bit input, 11-bit output adder 224 and subtracter 225, and the 11-bit output data from them is input into data converters 226 and 227, respectively. Data converters 226 and 227 output and send to selector 228, data consisting of a total of 10 bits, i.e. the sign bit plus the 9 bits after the removal of the highest bit of the absolute value data bit.

The output XI of data converter 226 can then be expressed as the following equation:

$$XI = A \cdot \cos(2\pi K/128) + B \cdot \sin(2\pi K/128)$$

The output YI of data converter 227 can then be expressed as the following equation:

$$YI = B \cdot \cos(2\pi K/128) - A \cdot \sin(2\pi K/128)$$

The outputs of data converters 212, 226, 213, and 227 constitute the result of the first butterfly computation.

Since results are determined and set in registers 202 through 207 immediately after specified data is set in them, data 106 can be sent to RAM 103 by operating selector 228 in sequence. This kind of control is performed based on control signal 109 from FFT control circuit 104.

FIG. 8 shows how the data bit length changes during the above-mentioned FFT computation process, for output 107 (FFT computation target data) from RAM 103, outputs 230 and 235 from data converters 212 and 213, and the output from coefficient ROM 101. As can be seen from FIG. 8, the present invention uses data shift circuit 201, data converters 212 through 215, data converters 220 through 223, and data converters 226 and 227 to standardize data to a certain bit width, and thus eliminates the need for overflow monitoring. Therefore, FFT computation can be carried out at a high level of precision without any complicated control means, making the small FFT computing unit 102 sufficient.

Note that an FFT result is determined and stored in RAM 103 by performing the remaining six butterfly computations after performing the first butterfly computation on all of the FFT computation target data. However, as explained above, data shift circuit 102 that is inside the input of FFT computing unit 102 functions only during the first round, and the input data is output as is during the remaining six rounds. In implementing the above sequence, addressing and control of RAM 103 and coefficient ROM 101 are performed by FFT control circuit 104 based on the Sande-Tukey algorithm.

Embodiment 2

FIG. 9 shows a functional block diagram of the FFT computation device of the second embodiment, and the same reference numerals are used to indicate similar elements as those of the FFT computing unit shown in FIG. 4. The FFT computation device in the second embodiment also uses FFT computing unit 23 shown in FIG. 1 as a representative example of the invention. This FFT computing unit is described as FFT computing unit 602 in FIG. 9, and its detailed configuration is divided and described in FIGS. 10 and 11.

The individual configuration elements shown in FIG. 9 correspond to the individual configuration elements shown in FIGS. 2 and 3 as follows. First, sensor 620 shown in FIG. 9 corresponds to signal detection means 30 shown in FIG. 3; amplification circuit 621 shown in FIG. 9 corresponds to amplification circuit 31 shown in FIG. 3; analog to digital or A/D converter 622 shown in FIG. 9 corresponds to signal conversion means 32 shown in FIG. 3; and gain control circuit 623 shown in FIG. 9 corresponds to gain control means 33 shown in FIG. 3. First RAM 625, second RAM 626, and coefficient ROM 101 shown in FIG. 9 correspond to first storage means 20, second storage means 21, and third storage means 22 shown in FIGS. 2 and 3, respectively; and level determination circuit 624 shown in FIG. 9 corresponds to level determination means 24 shown in FIGS. 2 and 3.

In this example, if sensor 620, amplification circuit 621, A/D converter 622, and gain controller 623 are removed from FIG. 9, the result is equivalent to the functional block diagram of a representative configuration of the invention shown in FIG. 2. These circuit blocks are used in the embodiment described below since this embodiment uses the detection signals from sensor 620 whose signal fluctuation level is relatively large. However, these circuit blocks are not required if stable signals with little level fluctuations are used.

Note that the input/output bit length, FFT computation target data count, and trigonometric table of the individual FFT computing units are the same as those in the first embodiment.

In FIGS. 9 through 11, a certain minute signal is detected by sensor 620, and after this minute signal is amplified by amplification circuit 621, the data that is converted into digital values by A/D converter 622 is sequentially stored in first RAM 625. When a specified number of pieces of data has been stored in first RAM 625, the specified data in first RAM 625 (FFT computation target data) is sent to second RAM 626. If FFT computation is performed with part of the data overlapping, the original data will be destroyed in the process of FFT computation. Therefore, the original data is retained in first RAM 625, and FFT computation is performed after the data is sent to second RAM 626.

Here, level determination circuit 624 checks the size of the data being transferred (FFT computation target data) during the data transfer, and uses output signal 611 to inform shift adjustment circuit 920 (to be explained below with reference to FIG. 12A) of FFT computing unit 602 of the data shift required.

For example, Table 1 shows the relationship between the size (effective bit length) of FFT computation target data and the shift specified by level determination circuit 624.

TABLE 1

| Effective bit length | Specified shift | Level determination device output (611) | | | | | | |
|---|---|---|---|---|---|---|---|---|
| | | 611g | 611f | 611e | 611d | 611c | 611b | 611a |
| 1 bit | 6 bits | 1 | 0 | 0 | 0 | 0 | 0 | 0 |
| 2 bits | 5 bits | 0 | 1 | 0 | 0 | 0 | 0 | 0 |
| 3 bits | 4 bits | 0 | 0 | 1 | 0 | 0 | 0 | 0 |
| 4 bits | 3 bits | 0 | 0 | 0 | 1 | 0 | 0 | 0 |
| 5 bits | 2 bits | 0 | 0 | 0 | 0 | 1 | 0 | 0 |
| 6 bits | 1 bit | 0 | 0 | 0 | 0 | 0 | 1 | 0 |
| 7 bits | 0 bit | 0 | 0 | 0 | 0 | 0 | 0 | 1 |

As can be seen from Table 1, when the effective bit length is short, the data shift can be increased in order to more effectively utilize the data as FFT computation target data, thus improving computational precision.

Furthermore, as can be seen from FIG. 9, output 611 of the level determination circuit is also input into gain control circuit 623, controlling the gain of amplification circuit 621 in the direction that will eliminate the need for data shift adjustment.

For example, Table 2 shows the relationship between the shift specified by the level determination circuit and the control volume of the gain control circuit in this embodiment.

TABLE 2

| Specified shift | Gain control volume |
|---|---|
| 6 bits | 64 times |
| 5 bits | 32 times |
| 4 bits | 16 times |
| 3 bits | 8 times |
| 2 bits | 4 times |
| 1 bit | 2 times |
| 0 bit | 1 time |

As can be seen from Table 2, when the shift is large (i.e., the effective bit length of the data is short), the gain of amplification circuit 621 is increased by increasing the gain control volume. Since this increases the amplification rate of the signals detected by sensor 620, the effective bit length of the data becomes longer, decreasing the required data shift or eliminating the need for data shift altogether.

Again in FIGS. 9 through 11, after the data is sent to second RAM 626, FFT computing unit 602 begins FFT computation. First, the xr, xi, yr, and yi data of second RAM 626 is set in registers 702 through 705 via data shift circuit 701. Data shift circuit 701 standardizes the FFT computation target data stored in second RAM 626 to the 10 bits of the computing unit input bit length as in the first embodiment, and the data is then shifted by the amount specified by level determination circuit 624.

The shift specification information is input into shift adjustment circuit 920 shown in FIG. 12A as output signal 611 (7-bit signal 611a through 611g) of level determination circuit 624. Here, data shift circuit 701 performs the computation shown in FIG. 12B on 8-bit data 902 through 908 of the 10-bit data from data shift circuit 201 shown in FIG. 7, and outputs 10-bit data that includes 8-bit data 912 through 918. For example, if the specified bit shift is 3 bits, "H" is input into 611d only, as shown in Table 1. The computation by shift adjustment circuit 920 shown in FIG. 12B shifts the absolute value data by 3 bits to the left, and 0's are entered in the three bits that no longer contain data because of the shift, and the resulting 10-bit data is output. The data shift function is activated only during the first round, and this kind of control is performed by FFT control circuit 604 using control signal 108.

Subsequently, the values of C·sin(2πK/128) and C·cos(2πK/128) from coefficient ROM 101 are set in registers 706 and 707, completing the data setting for butterfly computation.

Next, the operation enters a sequence in which, to determine XR, XI, YR, and YI, computation is made while switching between addition and subtraction for selectors 712 and 713 inside FFT computing unit 602, and for adders/subtracters 708 and 709, and the result is sent to RAM.

First, the determination of XR and YR will be explained. During this operation, adders/subtracters 708 and 709 are set as adders and are 10-bit input/11-bit output computing units (with the highest bit used as the sign bit). The 11-bit output data is input to data converters 710 and 711, the lowest bit is truncated, and the upper 10-bit data is sent to the next step. Output 730 of data converter 710 is XR(XR=xr+xi) and output 735 of data converter 711 is YR(YR=yr+yi) and the results of XR and YR are sent to second RAM 626 by switching selector 720.

Next, the determination of XI will be explained. During this operation, adders/subtracters 708 and 709 are set as subtracters and are 10-bit input/11-bit output computing units (with the highest bit used as the sign bit). The 11-bit output data is input into data converters 710 and 711, the lowest bit is truncated, and the upper 10-bit data is sent to the next step. The output of data converter 710 is A(A=xr−xi) and the output of data converter 711 is B(B=yr−yi), which become inputs 731 and 733 on one side of multipliers 714 and 715, respectively. During this step, the bottom side is selected for selector 712, and the top side is selected for selector 713. Since C·sin(2πK/128) and C·cos(2πK/128) are set in registers 706 and 707, respectively, these values become inputs 732 and 734 on the other side of multipliers 714 and 715.

Multipliers 614 and 615 are 10-bit input (with the highest bit used as the sign bit), 19-bit output computing units (with the highest bit used as the sign bit), and the sign bit along with the upper bits 2 through 10 of the absolute value bits, i.e., a total of 10 bits, are decoded by data converters 716 and 717, and are sent to the next step.

Here, the outputs of data converters 716 and 717 can be expressed as follows.

Output of data converter 716=A·cos(2πK/128)
Output of data converter 717=B·sin(2πK/128)

During the determination of XI, adder/subtracter 718 is set as an adder, and the addition result XI(XI=A·cos(2πK/128)+B·sin(2πK/128)) is input into data converter 719. Data converter 719 truncates the lowest bit from the 11-bits of the input data, and sends the upper 10 bits to selector 720; and by switching selector 720 to the direction for outputting this data, the XI result is sent to second RAM 626.

During the determination of YI by switching selectors 712 and 713 to the bottom side and setting adder/subtracter 718 is set as a subtracter, subtraction result YI(YI=B·cos(2πK/128)−A·sin(2πK/128)) is determined, and the result is sent to second RAM 626 in the same procedure as that used for XI;

FIG. 13 shows how the data bit length changes during the FFT computation in the second embodiment, for output 107 from RAM 626, outputs 730 and 735 of data converters 710 and 711, and for output 105 from coefficient ROM 101. As can be seen from FIG. 13, the use of data shift circuit 701, and data converters 710, 711, and 719, standardizes data to a certain bit width, and eliminates the need for overflow monitoring. Therefore, FFT computation can be carried out without any complicated control means, making the small FFT computing unit 602 sufficient. Furthermore, since data size is judged by level determination circuit 624, it is not necessary to separately allocate time for the level determination to be performed for adjusting the shift. Moreover, gain control circuit 633 changes the amplification rate of amplification circuit 621 based on the level determined by level determination circuit 624. Therefore, since the detected signal itself before digital conversion can be controlled to a size suitable to FFT computation in an analog format, computational precision in subsequent FFT computation results can be improved when FFT computations are continuously made.

Note that switching of selectors 712, 713, and 713 is controlled by FFT control circuit 604 using control signals 612, 613, and 614.

An FFT result is determined by performing the remaining six butterfly computations after the first butterfly computation is finished and the first butterfly computation is performed on all of the FFT computation target data. However, as explained above, data shift circuit 701 that is inside the input of FFT computing unit 602 functions only during the first round, and the input data is output as is during the remaining six rounds. In implementing the above sequence, addressing and control of second RAM 626 and coefficient ROM 101 are performed by FFT control circuit 604 based on the Sande-Tukey algorithm.

Working Examples

The FFT transformation devices related to the above-mentioned first and second embodiments can be utilized for processing and analyzing pulse signals that are obtained over time, for example. Therefore, an example will be explained in which an FFT computing unit utilizing the invention is applied to a pulse counter.

Overall Configuration of the Portable Pulse Counter

FIGS. 14A and B show the overall configuration of the portable pulse counter in this example.

In this figure, portable pulse counter 1001 of this example primarily comprises device main body 1010 possessing a wristwatch structure, cable 1020 connected to this device main body 1010, and pulse sensor unit 30 installed on the tip of this cable 1020. The tip of cable 1020 is provided with connector piece 1080 which is detachably attached to connector area 1070 provided on the 6 o'clock side of device main body 1010. Wristband 1012, which is wrapped around the wrist from the 12 o'clock direction of the wristwatch and fastened in the 6 o'clock direction, is installed in device main body 1010; and this wristband 12 allows device main body 1010 to be easily put on or taken off from the wrist. Pulse wave sensor unit 1030 is attached to the area between the base of the index finger and a finger joint and is shielded from light by sensor-fastening strap 1040. Attaching pulse wave sensor unit 1030 to the base of a finger in this way keeps cable 1020 short and prevents it from getting in the way during running. Furthermore, taking into consideration the temperature distribution between the palm and finger tip in cold weather, the temperature at the finger tip falls substantially, while the temperature at the base of the finger falls relatively little. Therefore, attaching pulse wave sensor unit 1030 at the base of the finger enables the pulse count (status value) to be accurately measured even during a run outside on a cold day.

Configuration of the Device Main Body

FIG. 16 is a top view showing the main body of the pulse counter of this example, with the wristband and cable removed; FIG. 17 is a side view of this pulse counter, obtained from the 3 o'clock direction.

In FIG. 16, device main body 1010 is provided with plastic watch case 1011 (body case), and the top side of this watch case 11 is provided with liquid crystal display device 1013 with an electroluminescent or EL backlight for displaying running time, pitch during walking, and pulse wave information such as pulse count, in addition to current time and date. Liquid crystal display device 1013 is provided with first segment display area 1131 positioned on the upper left side of the display surface, second segment display area 1132 positioned on the upper right side of the display surface, third segment display area 1133 positioned on the lower right side of the display surface, and dot display area 1134 which can graphically display various types of information positioned on the lower left side of the display.

Control area 1005, which performs various types of control and data processing in order to determine the change in the pulse count based on the pulse wave signal (status signal) measured by pulse wave sensor unit 1030 and to display the result on liquid crystal display device 1013, is provided inside watch case 1011. Control area 1005 is also provided with a timing circuit and thus can display normal time, lap time, split time, etc. on liquid crystal display device 1013.

Button switches 1111 through 1115, which are used for external operations such as time adjustment and display mode switching, are provided on the perimeter of watch case 1011. Additionally, larger button switches 1116 and 1117 are provided on the surface of the watch case.

Button-shaped small battery 1059 contained inside watch case 1011 is installed in portable pulse counter 1001, and cable 1020 supplies electrical power from battery 1059 to pulse wave sensor unit 1030 and at the same time inputs the detection result of pulse wave sensor unit 1030 into control area 1005 of watch case 1011.

The size of device main body 1010 must be increased as more functions are added to portable pulse counter 1001. However, device main body 1010 cannot be extended in the 6 or 12 o'clock directions of the watch because it must be worn around a wrist. Therefore, device main body 1010 uses watch case 1011 which is longer in the 3 and 9 o'clock directions than in the 6 and 12 o'clock directions. However, wristband 1012 is connected eccentrically toward the 3 o'clock side, leaving extended area 1101 in the 9 o'clock direction, viewed from wristband 12, but no such extended area in the 3 o'clock direction. Consequently, this structure, despite the use of long watch case 1011, allows free wrist movement and eliminates the possibility of the back of the hand striking watch case 1011 even when the wearer falls down.

Flat piezoelectric element 1058 for a buzzer is positioned in the 9 o'clock direction, viewed from battery 1059, inside watch case 1011. Because battery 1059 is heavier than piezoelectric element 1058, the center of gravity of device main body 1010 is positioned eccentrically in the 3 o'clock direction. Because wristband 1012 is connected to the side on which the center of gravity is located, device main body 1010 can be securely attached to the wrist. Furthermore, the positioning of battery 1059 and piezoelectric element 1058 in the planar direction allows device main body 1010 to be thin; battery cover 1118 installed on the back side as shown in FIG. 16 allows the user to easily replace battery 1059.

Structure for Attaching the Device Main Body to the Wrist

In FIG. 16, connecting area 1105 for holding stopping pin 1121 installed on the end of wristband 1012 is formed in the 12 o'clock direction of watch case 1011. Receiving area 1106 is provided in the 6 o'clock direction of watch case 1011, and said receiving area 1106 is provided with fastener 1122 through which wrist band 1012 is folded back and which holds in place the middle point of wristband 1012 wound around the wrist, in the long direction of the band.

In the 6 o'clock direction of device main body 1010, the area from bottom surface 1119 to receiving area 1106 is formed as an integral part of watch case 1011 and forms rotation stop area 1108 which is positioned at approximately 115° from bottom surface 1119. That is, when wristband 1012 is used to attach device main body 1010 to top area L1 (side of the back of the hand) of right wrist L (arm), bottom surface 1119 of watch case 1011 tightly contacts top area L1 of wrist L while rotation stop area 1108 contacts side area L2 where radius R is located. In this state, bottom surface 1119 of device main body 1010 more or less straddles radius R and ulna U, while rotation stop area 1108 and the area between bent area 1109 of bottom surface 1119 and rotation stop area 1108 contact radius R. Because rotation stop area 1108 and bottom surface 1119 form an anatomically ideal angle of approximately 115° as explained above, device main body 1010 will not turn around arm L even if an attempt is made to turn it in the direction of arrows A or B. Furthermore, because the rotation of device main body 1010 is restricted only in two locations on the side of the arm by bottom surface 1119 and rotation stop area 1108, bottom surface 1119 and rotation stop area 1108 securely contact the arm even if it is thin, and provide a secure rotation stopping effect and comfortable fit even if the arm is thick.

Configuration of the Pulse Sensor Unit

FIG. 17 shows a cross-sectional view of the pulse sensor unit of this working example.

In this figure, component housing space 1300 is formed between the casing of pulse wave sensor unit 1030 and bottom lid 1302 on the bottom side of sensor frame 1036. Circuit board 1035 is positioned inside component housing space 1300. LED 1031, phototransistor 1032, and other electronic components are mounted on circuit board 1035. One end of cable 1020 is fastened to pulse wave sensor unit 1030 by bushing 1393, and various wires of cable 1020 are soldered to various patterns on circuit board 1035. Pulse wave sensor unit 1030 is attached to the finger such that cable 1020 is extended from the base of the finger toward device main body 1010. Therefore, LED 1031 and phototransistor 1032 are arranged along the length of the finger, with LED 1031 positioned on the finger tip side and phototransistor 1032 positioned at the base of the finger. This configuration provides the effect of making it difficult for the ambient light to reach phototransistor 1032.

In pulse wave sensor unit 1030, a light transmission window is formed by translucent plate 1034 which is made of a glass plate on the upper area of sensor frame 1036, and the light-emitting surface and light-receiving surface of LED 1031 and phototransistor 1032, respectively, are oriented toward said translucent plate 1034. Because of such a configuration, when a finger surface is pressed onto external surface 1341 of translucent plate 1034, LED 1031 emits light toward the finger surface and phototransistor 1032 can receive part of the light emitted by LED 1031 that is reflected by the finger. Note that external surface 1341 of translucent plate 1034 protrudes farther than surrounding area 1361 in order to improve its contact with the finger surface.

In this working example, an InGaN (indium-gallium-nitrogen) blue LED is used as LED 1031, and its emission spectrum possesses a peak at 450 nm and its emission wavelength ranges from 350 to 600 nm. To match with LED 31 possessing such characteristics, a GaAsP (gallium-arsenic-phosphorus) phototransistor is used as phototransistor 1032, and the light-receiving wavelength of the element itself ranges from 300 to 600 nm, with some sensitive areas also at or below 300 nm.

When pulse wave sensor unit 1030 thus configured is attached to the base of the finger by sensor-fastening strap 1040 and light is emitted from LED 1031 toward the finger, the light reaches blood vessels, and part of the light is absorbed by hemoglobin in the blood and part of it is reflected. The light reflected by the finger (blood) is received by phototransistor 1032, and the change in the amount of received light corresponds to the change in the blood volume (pulse wave in the blood). That is, because the reflected light becomes weak when the blood volume is high and becomes strong when the blood volume is low, data such as pulse count can be measured by optically detecting the intensity of the reflected light as a pulse wave signal.

This working example uses LED 1031 with an emission wavelength range of between 350 and 600 nm and phototransistor 1032 with a light-receiving wavelength range of between 300 and 600 nm, and vital information is displayed based on the results taken in the overlapping wavelengths of between approximately 350 and approximately 600 nm, i.e., wavelengths of approximately 700 nm or shorter. When such pulse wave sensor unit 1030 is used, even if the ambient light strikes the exposed part of the finger, lights with wavelengths of 700 nm or shorter contained in the ambient light do not use the finger as a light guide to reach phototransistor 1032 (light-receiving area). The reason for this is as follows. Because lights with wavelengths of 700 nm or shorter contained in the ambient light do not easily penetrate the finger, the ambient light reaching the area of the finger not covered by the sensor fastening strap 1040 will not penetrate the finger to reach phototransistor 1032. In contrast, if an LED possessing an emission peak at around 880 nm and a silicon phototransistor are used, a light-receiving wavelength range of between 350 and 1,200 nm will result. In such a case, changes in the ambient light level tend to cause measurement errors because pulse waves will be detected using a light with 1 $\mu$m wavelength which can use the finger as a light guide to easily reach the light receiving area.

Furthermore, because pulse wave information is obtained using lights with approximately 700 nm or shorter wavelengths, the S/N ratio of the pulse wave signal based on blood volume change is high. The reason for this is as follows. The absorption coefficient of hemoglobin in the blood for lights with wavelengths of between 300 and 700 nm is several times to approximately one hundred or more times larger than the absorption coefficient for a light with wavelength of 800 nm which has been conventionally used as the detection light. As a result, lights with wavelengths of between 300 and 700 nm change sensitively to blood volume changes, producing higher pulse wave detection rate (S/N ratio) based on blood volume change.

Configuration of the Pulse Wave Data Processing Area As shown in FIG. 18, control area 1005 is provided with pulse wave data processing area 1050 which determines the pulse count based on the input result from pulse wave sensor unit 1030, and this pulse wave data processing area 1050 outputs a pulse count calculation result, enabling this value to be displayed in liquid crystal display device 1013. Note that part of pulse wave data processing area 1050 comprises a microcomputer that runs based on stored programs, and the functions of this microcomputer are also shown as a block diagram in FIG. 18.

First, in pulse wave data processing area 1050, the analog signal that is input from pulse wave sensor unit 1030 is amplified by amplification circuit 1551 and is then output to AD converter 1553. Pulse wave data storage area 1554 is RAM that stores the pulse wave data that has been converted into a digital signal by AD converter 1553.

Frequency analysis area 1052 is provided behind pulse wave data storage area 1554, which performs fast Fourier transformation (FFT processing) for analyzing the frequency of the pulse wave data fetched from said pulse wave data storage area 1554, and this frequency analysis area 1052 inputs the frequency analysis result into pulse wave component extraction area 1053. Pulse wave component extraction area 1053 extracts the pulse wave component from the output signal of frequency analysis area 1052 and outputs it to pulse count calculation area 1054, and pulse count calculation area 1054 calculates the pulse count based on the frequency component of the pulse wave that was input.

In pulse wave data processing area 1050 thus configured, FFT computing units 23, 102, and 602 explained by referencing FIGS. 1, 5, 6, 10, and 11 can be used as frequency analysis area 1052. Since the operation of frequency analysis area 1052 (FFT computing units 23, 102, and 602) was explained earlier, its details will be omitted here. In any case, when FFT processing is performed on the pulse wave data fetched from pulse wave data storage area 1554, a spectrum can be obtained in which individual line spectrums discretely appear with intervals corresponding to the resolutions used during frequency analysis, as schematically shown in FIG. 19. Therefore, when pulse wave component extraction area 1053 identifies a target spectrum among a group of line spectrums, pulse count calculation area 1054 calculates the pulse count, and pitch, etc. based on the frequency of the target spectrum. For example, if the target spectrum appears at the position of 2 Hz, the result indicating a pulse count of 120/minute is obtained.

When determining the pulse count through FFT processing in this way, use of the FFT computing unit based on the invention enables FFT processing to be performed at a high level of computational precision without overflow monitoring, making a small FFT computing unit sufficient. Therefore, the FFT computing unit related to the invention is suitable for installation in portable instruments.

As the comparison between pulse wave data processing area 1050 shown in FIG. 18 and the FFT computation device shown in FIG. 9 indicates, pulse wave sensor unit 1030, amplification circuit 1551, AD converter 1553, pulse wave data storage area 1554, and frequency analysis area 1052 shown in FIG. 9 correspond to sensor 620, amplification circuit 621, AD converter 622, RAM 625, and FFT computing unit 602 shown in FIG. 9, respectively. Therefore, if level determination circuit 624 explained with reference to FIG. 9 is added to pulse wave data processing area 1050 shown in FIG. 18, it would not be necessary to separately allocate time for the level determination to be performed for adjusting the shift. Furthermore, if gain control circuit 623 is added, the detected signal itself before digital conversion can be controlled to a size suitable to FFT computation in an analog format.

The foregoing description of the preferred embodiments of the invention is only by way of example, and other variations of the above-described embodiments and methods are provided by the present invention. While the preferred embodiment is implemented by specialized processing circuits, It should be noted here that the components of this invention may be conveniently implemented using a conventional general purpose processor programmed according to the teachings of this specification, as will be apparent to those skilled in the computer arts. Appropriate software coding can be readily prepared based on the teachings of the present disclosure, as will be apparent to those skilled in the software art. The present invention may also be implemented by the preparation of application specific integrated circuits or by interconnecting an appropriate network of conventional component devices and circuits, as will be readily apparent to those skilled in the art.

As will be apprecited by one of ordinary skill in the art would, the present invention as implemented by a general purpose processor executes instructions of appropriate software stored on a computer-readable storage medium. The storage medium containing such instructions can include, but is not limited to, any type of disk media including floppy disks, optical disks, CD-ROMs, magneto-optical disks, hard drives or disk arrays, whether located within or external to the processing system. Alternately, the storage medium can include ROM, RAM, EPROM, EEPROM, flash EEPROM or any other type of media suitable for storing computer-readable instructions.

FIG. 20 illustrates in more detail a fast Fourrier Transformation device 2000, which includes system memory 2100, processor or CPU 2001 and sensor interface 2005 interconnected via a system bus 2006 well known in the computer arts. Also interconnected to the system bus 2006 is system-addressable storage device 2002 capable of accepting, reading and writing information to a type of removable media 2003 and external store 2004 as representative storage mediums in communication with representative processing system 2000. Accordingly, in this representative processing system, programming instructions corresponding fast Fourrier Transformation unit 2020 may be partially or fully contained within external store 2004, removable media 2003, or system memory 2100 as is well known in the art.

Removable media 2003 may include a floppy disk, CD-ROM, ROM cartridge or other apparatus suitable for holding information in computer readable form. Similarly, external store 2004 may include another processing system, a computer readable storage component, a collection or network of processing systems and/or storage components, or similar device or devices in communication with processing system 2000 to exchange information including the above-mentioned thread instructions. Further, in this embodiment, processing system 2000 is indicated as being a general purpose personal computer. However, an ordinary skill with knowledge of the presently preferred embodiment according to the present invention should know that the particular processing system could alternatively include, for example, a special-purpose dedicated micro-controlled subsystem or similar processing device as long as it has sufficient resources for at least sequential execution of the techniques described and charted hereinabove and has sufficient interfacing resources to communicate and exchange information with the sensor unit 2021.

The embodiments described herein have been presented for purposes of illustration and are not intended to be exhaustive or limiting, and many variations and modifications are possible in light of the foregoing teaching.

REFERENCE NUMERALS

1~4 . . . Data shift means
5, 6, 10 . . . Adders/subtracters
7 . . . Sine wave, cosine wave data
8, 9 . . . Multiplication means
11~15 . . . Data conversion means
20 . . . First storage means
21 . . . Second storage means
22 . . . Third storage means
23, 102, 602 . . . FFT computing units
24 . . . Level determination means
30 . . . Signal detection means
31 . . . Amplification means
32 . . . Signal conversion means
33 . . . Gain control means
101 . . . Coefficient ROM
103 . . . RAM
104, 604 . . . FFT control circuits
201, 701 . . . Shift circuits
202~207, 702~707 . . . Registers
208, 209, 224 . . . Adders
210, 211, 225 . . . Subtracters
212~215, 220~223, 226, 227 . . . Data converters
710, 711, 716, 717, 719 . . . Data converters
216~219, 714, 715 . . . Multipliers
228, 712, 713, 720 . . . Selectors
620 . . . Sensor
621 . . . Amplification circuit
622 . . . AD converter
623 . . . Gain control circuit
624 . . . Level determination circuit
625 . . . RAM 1
626 . . . RAM 2
708, 709, 718 . . . Adders/subtracters
920 . . . Shift adjustment circuit
1001 . . . Portable pulse counter
1005 . . . Control area
1030 . . . Pulse wave sensor unit
1050 . . . Pulse wave data processing area
1551 . . . Amplification circuit
1553 . . . AD converter
1554 . . . Pulse wave data storage area
1052 . . . Frequency analysis area
1053 . . . Pulse wave component extraction area
1054 . . . Pulse count calculation area

What is claimed is:

1. A Fast Fourier transformation computing unit comprising:

first and second addition/subtraction means for computing one of a sum of and a difference between a pair of two pieces of integer data;

first and second multiplication means for multiplying an output of said first and second addition/subtraction means by sine and cosine wave data, respectively;

third addition/subtraction means for computing one of a sum of and a difference between outputs of said first and second multiplication means;

data shift means for standardizing to a predetermined bit width of the two pieces of integer data as input to said first and second addition/subtraction means;

data conversion means for standardizing a bit width of at least one of output data of said first, second and third addition/subtraction means and said first and second multiplication means to the predetermined bit width by truncating part of output data therefor; and level determination means for determining a size of input data, wherein said data shift means comprises a shift adjustment means for adjusting an amount of data shift in accordance with a determination by said determination means.

2. A Fast Fourier transformation computing unit according to claim 1, wherein when an input bit width of each of said first, second and third addition/subtraction means and said first and second multiplication means is n bits, wherein n is an integer, and wherein the sine and cosine wave data is converted into an integer by multiplying the sine and cosine wave data of a real number by $2^{n-1}$, truncating any positive numbers, and rounding up any negative numbers, whose bits excluding the sign can be expressed within n−1 bits.

3. A Fast Fourier transformation computing unit according to claim 1, wherein said data conversion means truncates a highest bit, excluding a sign bit, when converting output data of at least one of said first and second multiplication means and said third addition/subtraction means.

4. A Fast Fourier transformation computation device comprising:

a Fast Fourier transformation computing unit comprising:
first and second addition/subtraction means for computing one of a sum of and a difference between a pair of two pieces of integer data,
first and second multiplication means for multiplying an output of said first and second addition/subtraction means by sine and cosine wave data, respectively,
third addition/subtraction means for computing one of a sum of and a difference between outputs of said first and second multiplication means,
data shift means for standardizing to a predetermined bit width of the two pieces of integer data as input to said first and second addition/subtraction means, and
data conversion means for standardizing a bit width of at least one of output data of said first, second and third addition/subtraction means and said first and second multiplication means to the predetermined bit width by truncating part of output data therefor;

first storage means for sequentially storing time series data;

second storage means for storing Fast Fourier transformation computation target data and data from said Fast Fourier Transformation Computing Unit;

level determination means for determining a size of the data stored in second storage means;

third storage means for storing the sine wave and cosine wave data to be applied by said first and second multiplication means, wherein said Fast Fourier Transformation computing unit processes data from said second storage means and said third storage means; and wherein said level determination means determines a size of transferred data after a predetermined number of pieces of data is stored in said first storage means, simultaneously with sending of the Fast Fourier transformation computation target data to said second storage means, wherein said data shift means adjusts the data shift in accordance with a determination by said determination means.

5. A Fast Fourier transformation computation device comprising:
a Fast Fourier transformation computing unit comprising:
first and second addition/subtraction means for computing one of a sum of and a difference between a pair of two pieces of integer data;
first and second multiplication means for multiplying an output of said first and second addition/subtraction means by sine and cosine wave data, respectively;
third addition/subtraction means for computing one of a sum of and a difference between outputs of said first and second multiplication means,
data shift means for standardizing to a predetermined bit width of the two pieces of integer data as input to said first and second addition/subtraction means, and
data conversion means for standardizing a bit width of at least one of output data of said first, second and third addition/subtraction means and said first and second multiplication means to the predetermined bit width by truncating part of output data therefor;
signal detection means for detecting an input signal;
amplification means for amplifying the signal detected by said signal detection means;
gain control means for changing an amplification rate of said amplification means;
signal conversion means for digitally converting an output of said amplification means;
first storage means for sequentially storing an output signal of said signal conversion means;
second storage means for storing Fast Fourier transformation computation target data and data computed by said Fast Fourier transformation computing unit;
level determination means for determining a size of the data stored in said second storage means;
third storage means for storing the sine wave and cosine wave data to be provided to said first and second multiplication means,
wherein said Fast Fourier transformation computing unit uses data from said second storage means and said third storage means; and
wherein after a predetermined number of pieces of data is stored in said first storage means, simultaneously with sending of the Fast Fourier transformation computation target data to said second storage means, the size of the transferred data is determined by said level determination means, and in accordance with said level determination means, said gain control means changes the amplification rate of said amplification means.

6. A pulse counter comprising:
a pulse wave sensor sensing a pulse wave signal;
a Fast Fourier transformation computing unit:
first and second addition/subtraction means for computing one of a sum of and a difference between a pair of two pieces of integer data input from said pulse wave sensor;
first and second multiplication means for multiplying an output of said first and second addition/subtraction means by sine and cosine wave data, respectively;
third addition/subtraction means for computing one of a sum of and a difference between outputs of said first and second multiplication means;
data shift means for standardizing to a predetermined bit width of the two pieces of integer data as input to said first and second addition/subtraction means;
data conversion means for standardizing a bit width of at least one of output data of said first, second and third addition/subtraction means and said first and second multiplication means to the predetermined bit width by truncating part of output data therefor; and
level determination means for determining a size of input data, wherein said data shift means comprises a shift adjustment means for adjusting an amount of data shift in accordance with a determination by said determination means,
wherein said Fast Fourier transformation computing unit determines a pulse count based on a frequency analysis result by said Fast Fourier transformation computing unit.

7. A Fast Fourier transformation computing unit comprising:
first and second adder/subtractors computing one of a sum of and a difference between a pair of two pieces of integer data;
first and second multipliers multiplying an output of said first and second adder/subtractors by sine and cosine wave data, respectively;
third adder/subtractor computing one of a sum of and a difference between outputs of said first and second multipliers;
data shift register standardizing to a predetermined bit width of the two pieces of integer data as input to said first and second adder/subtractors;
data converter standardizing a bit width of at least one of output data of said first, second and third adder/subtractors and said first and second multipliers to the predetermined bit width by truncating part of output data therefor; and
level determination means for determining a size of input data, wherein said data shift means comprises a shift adjustment means for adjusting an amount of data shift in accordance with a determination by said determination means.

8. A method for calculating a Fast Fourier transformation comprising the steps of:
(a) first computing one of a sum of and a difference between two first pieces of integer data;

(b) second computing one of a sum of and a difference between two second pieces of integer data;

(c) multiplying each results of steps (a) and (b) by sine and cosine wave data, respectively;

(d) computing one of a sum of and a difference results of step (c);

(e) standardizing to a predetermined bit width of the two pieces of integer data as input for steps(a) and (b);

(f) standardizing a bit width of at least one of results of steps (a), (b), (c), and (d) to the predetermined bit width by truncating part of output data therefor;

(g) determining a size of input data; and (h) adjusting the predetermined bit width of step (e) in accordance with the of step (g).

9. A computer-usable medium having computer-readable program code embodied therein for causing a computer system, an input device, a memory, and a display, to perform a Fast Fourier transformation, comprising the steps of:

(a) first computing one of a sum of and a difference between two first pieces of integer data;

(b) second computing one of a sum of and a difference between two second pieces of integer data;

(c) multiplying each results of steps (a) and (b) by sine and cosine wave data, respectively;

(d) computing one of a sum of and a difference results of step (c);

(e) standardizing to a predetermined bit width of the two pieces of integer data as input for steps(a) and (b);

(f) standardizing a bit width of at least one of results of steps (a), (b), (c), and (d) to the predetermined bit width by truncating part of output data therefore (g) determining a size of input data; and (h) adjusting the predetermined bit width of step (e) in accordance with the of step (g).

10. A computer-usable medium having computer-readable program code embodied therein for causing a computer system, an input device, a memory, and a display, to perform a Fast Fourier transformation, the medium comprising:

(a) first computer readable program means for computing one of a sum of and a difference between two first pieces of integer data;

(b) second computer readable program means for computing one of a sum of and a difference between two second pieces of integer data;

(c) third computer readable program means for multiplying each results from said first computer readable program means and said second computer readable program means by sine and cosine wave data, respectively;

(d) fourth computer readable program means for computing one of a sum of and a difference results from said third computer readable program means;

(e) fifth computer readable program means for standardizing to a predetermined bit width of the two pieces of integer data as input for said first computer readable program means and said second computer readable program means; and (f) sixth computer readable program for standardizing a bit width of at least one of results of said first, second, third and fourth computer readable program means to the predetermined bit width by truncating part of output data therefor;

(g) seventh computer readable program for determining a size of input data; and eighth computer readable program for adjusting the predetermined bit width by said fifth computer readable program means in accordance with the said seventh computer readable program.

* * * * *

UNITED STATES PATENT AND TRADEMARK OFFICE
CERTIFICATE OF CORRECTION

PATENT NO.    : 5,854,758
DATED         : December 29 1998
INVENTOR(S)   : Tsukasa Kosuda, et al.

It is certified that errors appear in the above identified patent and that said Letters Patent is hereby corrected as shown below:

Title page, item 73, Assignee, insert --, Tokyo-- after "Corporation", insert --Chiba-ken-- after Instruments, Inc.,", and delete "Tokyo" after "both of".

Column 21, line 33, change "therefore" to --therefor--.

Signed and Sealed this

Fifteenth Day of February, 2000

Attest:

Q. TODD DICKINSON

*Attesting Officer*    *Commissioner of Patents and Trademarks*